United States Patent [19]

Nakamura

[11] 4,315,679
[45] Feb. 16, 1982

[54] ADAPTER DEVICE

[75] Inventor: Zenzo Nakamura, Urawa, Japan

[73] Assignee: Canon Kabushiki Kaisha, Tokyo, Japan

[21] Appl. No.: 79,598

[22] Filed: Sep. 27, 1979

[30] Foreign Application Priority Data

Dec. 25, 1978 [JP] Japan ............................... 53-163545
Apr. 28, 1979 [JP] Japan ............................. 54-57153[U]
Apr. 28, 1979 [JP] Japan ............................. 54-57154[U]
Apr. 28, 1979 [JP] Japan ............................. 54-57155[U]
Apr. 28, 1979 [JP] Japan ............................. 54-57156[U]

[51] Int. Cl.³ ....................... G03B 15/05; G03B 17/18
[52] U.S. Cl. ................................. 354/128; 354/60 F; 354/145; 354/149; 354/289
[58] Field of Search ...................... 354/31, 32, 33, 34, 354/35, 60 E, 60 F, 139, 145, 149, 127, 128, 289

[56] References Cited

U.S. PATENT DOCUMENTS 3,631,779  1/1972  Hori et al. ........................... 354/128
3,868,701  2/1975  Kawasaki ............................. 354/33
4,095,242  6/1978  Tsunekawa et al. ................. 354/33

Primary Examiner—Michael L. Gellner
Attorney, Agent, or Firm—Fitzpatrick, Cella, Harper & Scinto

[57] ABSTRACT

An adapter device for use with a versatile light adjusting flash illuminating device of the reflected light reception type or a slightly reformed flash illuminating device receives a light emission preparation signal of the flash illuminating device, for example, the charging completion signal of a main capacitor or a main switch ON signal and forms an exposure control signal for an exclusive camera. The adapter device is provided with a shoe for accommodating the leads of the flash unit and with a foot for connection with the leads of the exclusive camera.

3 Claims, 35 Drawing Figures

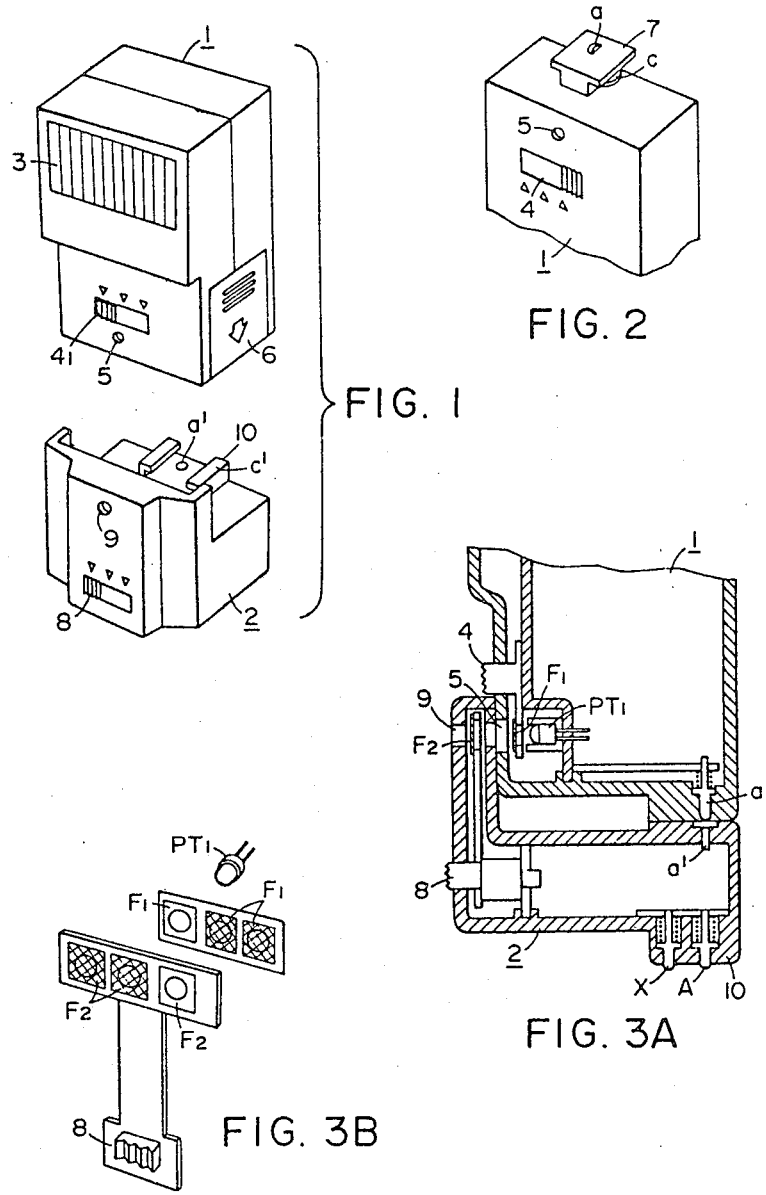

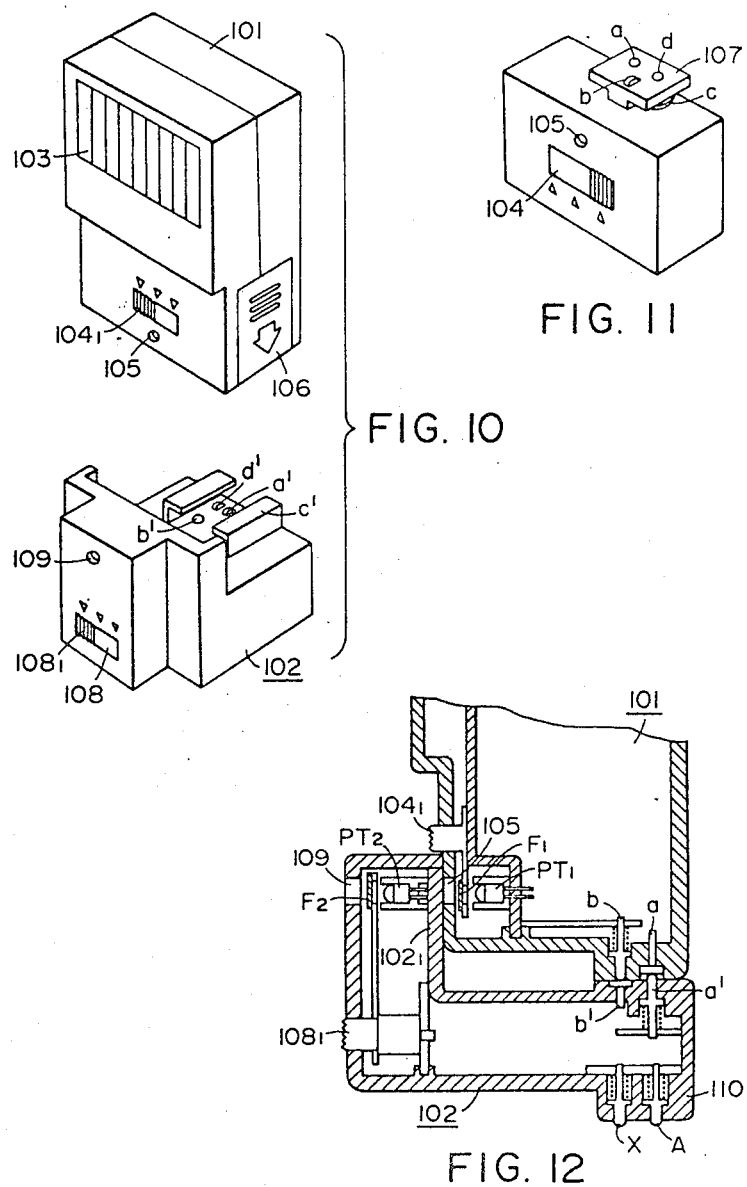

ADAPTER DEVICE

BACKGROUND OF THE INVENTION

1. Field of the Invention

This invention relates to an adapter for a flash illuminating device, and more particularly to an adapter for rendering a versatile flash illuminating device into an exclusive flash illuminating device suitable for use with various cameras.

2. Description of the Prior Art

What is known as the flash illuminating device has heretofore been called a strobo, which contains a boosting circuit, a main capacitor, a xenon tube, etc. and is caused to emit light by the tuning contact of a camera. In this case, on the camera side, the exposure information suitable for flash illumination photography, for example, the shutter time, is set to 1/90 sec. so that any malfunctioning such as slit exposure does not occur, and where the strobo is a light adjusting strobo, the operation of setting the aperture to an aperture value designated by the strobo is required prior to photography.

However, one is often apt to forget to set the shutter time and the like each time the flash illumination photography is to be carried out and if one forgets to set the shutter time and the like, one cannot obtain desirable photographs because the exposure is wrong. To eliminate such a disadvantage, there have been proposed various systems whereby the exposure value such as the shutter time may be automatically set when a flash-bulb flash device is set at its position for use (see, for example, German Pat. No. 1,262,765, U.S. Pat. No. 3,318,215, and U.S. Pat. No. 3,344,724). Particularly, in the case of a strobo, even if it is mounted to a camera, it will not emit light when the main capacitor is not charged to a level higher than its light-emitting level and for this reason, cameras in which the camer's shutter time is automatically set to a value suitable for flash photography only by closing a main switch have become commercially available. Further, there has been proposed a camera in which the shutter time or the aperture value is automatically set to a value suitable for flash photography only when the main switch is closed and the charge of the main capacitor reaches a predetermined amount (see U.S. Pat. No. 4,047,194), and various cameras of such type have become commercially available. When such camera is used, an electrical signal representing the closing of the main switch or the completion of the charging of the main capacitor is received from the strobo and automatically changed over into the shutter time or the like and therefore, the strobo usable with such camera must be an exclusive strobo suited for such camera. However, when photography is to be effected by using a versatile camera as well, it becomes necessary to prepare a versatile strobo (an ordinary strobo usable with other cameras than the exclusive camera) in addition to the exclusive strobo and this means a large scale of equipment. Also, where the quantity of light provided by the exclusive strobo is insufficient for the intended purpose, it is often the case that even if one has a versatile flash illuminating device having a great quantity of light, one cannot use such device with the exclusive camera and thus, one cannot fully effectively master various versatile strobos even if one has them on hand.

The commercially available exclusive strobos are provided with terminals positioned so as to correspond with the mounting portion of a camera, namely, the electrode on the accessory shoe, but the spacing between the terminals differs from one exclusive strobo to another and therefore, one must buy respective exclusive strobos for exclusive cameras. Also, an exclusive strobo is provided with a basic construction as a strobo, namely, a xenon tube, a main capacitor, a boosting circuit, etc., so that it may have the function as a strobo and therefore, when a versatile strobo is jointly used as described above, one must necessarily carry a weighty equipment because the versatile strobo also has the same basic construction as the exclusive strobo.

Also, there is a disadvantage that those who already have versatile strobos cannot use such strobos because such strobos are not at all usable with exclusive cameras.

As described above, the conventional versatile strobos are entirely useless for exclusive cameras and one must prepare a strobo suited for each individual camera and moreover, the conventional versatile strobos suffer from various problems in operability and portability.

Also, in these gears, the light adjusting type flash illuminating devices in which the reflected light from an object is metered so that the quantity of light emitted is automatically controlled in accordance with the metered quantity of light have come to be widely used because of their good operability. Such light adjusting type illuminating devices must be used with the camera's aperture device set to an aperture value designated to provide a proper exposure. With such devices, it is also possible to vary the light adjusting level in accordance with the object distance, but the designated aperture value is caused to assume a different value by varying the light adjusting level and therefore, the camera's aperture device must be re-set each time the light adjusting level is set. Also, as already described, even if the camera's shutter is of the focal type or the lens shutter type, it is necessary to set the shutter speed to a predetermined value in order to prevent slit exposure or to match the flash characteristic.

So, a flash system in which the setting of such designated aperture information and shutter speed is automatized to eliminate manual operation has been proposed, for example, in German Patent Publication No. 2,703,617 (published on Aug. 4, 1977 and corresponding to U.S. Pat. No. 4,047,194). This system requires four electrodes—the earth electrode, the synchronizing signal electrode for forming the transmission path of the trigger signal for triggering the discharge tube of the flash device, the photography mode change-over signal electrode forming the transmission path of the change-over signal for changing over the shutter speed control circuit or the aperture control circuit so as to be suited for flash photography, and the designated aperture signal electrode forming the transmission path of the designated aperture information—to be provided on both of the camera and the flash device and this has led to the complicated construction of the respective mounting members and in addition, when such flash device is used with a camera which does not have an aperture control circuit responsive to the designated aperture signal or a shutter speed control circuit responsive to the mode change-over signal, the designated aperture signal setting circuit or the photography mode change-over signal generating circuit provided in the flash device becomes useless and further, the flash device has been disadvantageous in that it is bulky and heavy because it contains such aperture signal setting circuit and photography mode change-over signal generating circuit.

Adapter devices adapted to be connected between a flash illuminating device and a camera to provide for various functions during flash photography are known. Most of them are for making the number or position of the terminals on the flash device side match the number or position of the terminals on the camera side, and simply transmit a tuning light emission signal from the camera side to the flash device side.

Also, an adapter device containing therein a display element for enabling it to be recognized on the camera side that the flash device has completed its light adjusting operation has been proposed (see, for example, U.S. Pat. No. 3,846,806). Further, an adapter device which enables it to be recognized on the camera side that the flash device has become ready to emit light has been proposed (see, for example, DAS No. 2,149,223). Still further, an adapter which, when the flash illuminating device has become ready to emit light, delivers guide number information to provide matching between the camera's terminal for operating the distance resistance input set on the camera side and the terminal of the flash device has been proposed (see, for example, U.S. Pat. No. 4,095,242). As will hereinafter be described, any of these adapter devices entirely differs from an adapter device which may be used with a versatile flash illuminating device, particularly, a light adjusting type electronic flash device, to receive, from the flash device, an exposure value control signal, namely, a mode change-over signal, for an exclusive camera and form a signal for adjusting the camera's exposure control device to a designated aperture value or a shutter time value providing a proper exposure for light adjusting flash photography, and there is known no adapter device constructed so that when the light adjusting level is varied, the change-over signal itself is varied.

SUMMARY OF THE INVENTION

It is the object of the present invention to provide an adapter which may be used with a versatile strobo or a flash illuminating device slightly improved over the versatile strobo, to solve the above-noted various disadvantages.

The invention will become fully apparent from the following detailed description thereof taken in conjunction with the accompanying drawings.

BRIEF DESCRIPTION OF THE DRAWINGS

FIG. 1 is a perspective view of an embodiment of the strobo and adapter according to the present invention.

FIG. 2 is a perspective view showing the construction of the essential surface portion of the strobo shown in FIG. 1.

FIG. 3A is a cross-sectional view of essential portions showing the FIG. 1 strobo as mounted to the adapter.

FIG. 3B shows the construction of the essential portions of the filter portion shown in FIG. 3A.

FIG. 10 is a perspective view of a further embodiment of the strobo and adapter according to the present invention.

FIG. 11 shows the construction of the essential portions of the bottom surface of the FIG. 10 strobo.

FIG. 12 is a cross-sectional view of essential portions showing the FIG. 10 strobo as mounted to the adapter.

DESCRIPTION OF THE PREFERRED EMBODIMENTS

Figure 4:
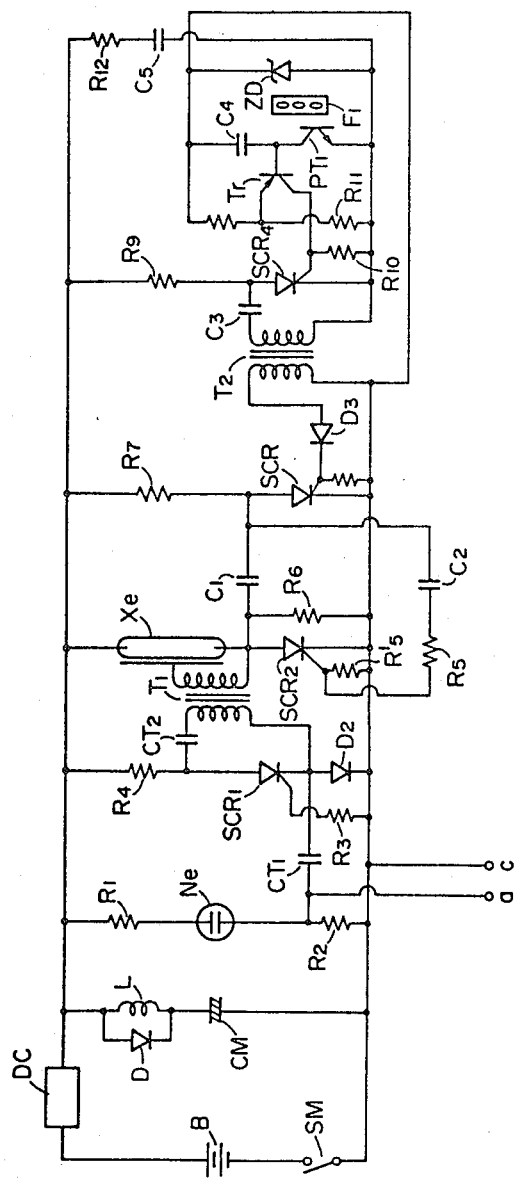
FIG. 4 is a diagram of the electric circuit of the FIG. 1 strobo.

Referring to FIGS. 1-6, there is shown an example of the construction of a light adjusting strobo and adapter, the strobo being one provided by slightly changing the terminal portion of a versatile light adjusting strobo and rendering such strobo into an exclusive strobo for an exclusive camera. In FIG. 1, reference numeral 1 designates the light adjusting strobo and reference numeral 2 denotes the adapter. Designated by 3 is the light-emitting portion of the light adjusting strobo, and designated by 4 is a designated aperture value setting change-over knob. The knob 4₁ may be slidden with respect to index marks on the housing to shift the light adjusting level, for example, to three stages of aperture F2.8, 4 and 5.6. Designated by 5 is a reflected light receiving portion, and denoted by 6 is a battery containing lid.

As shown in FIG. 2, a shoe mounting foot 7 is secured to the bottom surface of the strobo 1 and is provided with terminals a and c. The terminal a is a charging completion detection signal and tuning trigger terminal, and the terminal c is a grounded terminal. Details of these terminals will hereinafter be described. As shown in FIG. 3, reference numeral 8 designates a designated aperture setting change-over knob provided on the front face of the adapter 2. Index marks are provided so as to adjust the knob 8 to the three stages of aperture F2.8, 4 and 5.6, corresonding to the change-over knob 4. Accordingly, by sliding the knob 8 to coincide with the fixed index mark, the aperture device of the camera, to be described, may be set to the designated aperture F2.8, 4 and 5.6 from left. Designated by 9 is a reflected light receiving opening provided in the adapter 2. The adapter 2 has a shoe to which the mounting foot 7 may be fitted, and also has electrode terminals a' and c' which are adapted to be opposed to and contacted by the terminals a and c during the mounting of the adapter.

The terminal c' serves also as the channel member of the shoe. The light adjusting strobo 1 employed in the present embodiment, as will later be described, is of the type which can be triggered when the terminal voltage of a main capacitor assumes a charged condition, but it is of course possible to employ a light adjusting strobo in which a trigger terminal and a charging signal terminal are provided separately.

FIG. 3A is a cross-sectional view of essential portions showing the relation between the strobo 1 and the adapter 2 when the former is mounted to the latter. Since the reflected light receiving portion 5 of the strobo 1 is opposed to the light-receiving opening 9 of the adapter 2 during the mounting of the strobo, the reflected object light from the strobo 1 is received by a phototransistor $PT_1$, to be described, through the openings 9 and 5 and through ND filters F1 disposed rearwardly of the opening 5. Filters F1 and F2 and ND filters which may be slidden in front of the phototransistor $PT_1$ in response to the change-over knobs 4 and 8, respectively, and the density of which is variable in three stages when the knobs are set to each index mark. During the use of the adapter 2, the knob 4 on the strobo is set to the aperture F2.8 and as shown in FIG. 3B, it is used in a condition wherein the filter portion is set so as to be opposed to the opening 5. Designated by 10 is a shoe mounting foot provided on the bottom surface of the adapter 2. The shoe mounting foot 10 is so shaped as to fit the shoe on the camera and has signal terminals corresponding in number to the exclusive cameras with which the adapter 2 may be used. In the present embodiment, as will later be described, a camera in which a shutter time change-over signal and an aperture change-over signal are received from the adapter side so that the shutter time and the aperture value are automatically set is used as the exclusive camera and therefore, four terminals in total including the tuning contacts and the grounded terminals (one of them lies in the channel portion of the shoe) are exposed and they are disposed so as to correspond with the terminals of the exclusive camera.

FIG. 4 shows the electric circuit of the light adjusting strobo 1 shown in FIG. 3. It includes a power supply battery B, a main switch $S_M$, a boosting DC converter DC, a diode D, a coil L, a main capacitor $C_M$, voltage dividing resistors R1, R2, a neon tube Ne, a capacitor CT1 for triggering SCR1, a thyristor SCR1 for triggering a xenon tube, a capacitor CT2 for triggering the xenon tube, a transformer T1 for triggering the xenon tube, a xenon tube Xe, a light adjusting thyristor SCR2, a commutation capacitor C1, a capacitor C2 for triggering the thyristor SCR2, a light emission stopping thyristor SCR3, a transformer T2 for triggering the thyristor SCR3, a capacitor C3 for triggering the thyristor SCR3, a thyristor SCR4 for triggering the thyristor SCR3, a reflected light integrating capacitor C4 and resistors R3–R12. When the switch $S_M$ is closed, the converter DC is operated and a high tension output voltage starts to charge the capacitor $C_M$. When the capacitor $C_M$ has been charged up, the neon tube Ne is turned on and therefore, by a voltage induced in the resistor R2 due to the turn-on current, the capacitor CT1 is charged through the diode D2. The trigger capacitor CT2 is charged through the resistor R4 and the diode D2 while, on the other hand, the commutation capacitor C1 is charged through the charging path of resistor R7-C1-resistor R8, the capacitor C2 is charged through the charging path of resistor R7-C2-resistor R8 and the capacitor C3 is charged through the charging path of resistor R9-C3-transformer T2-Zener diode ZD, so that when the main capacitor $C_M$ has been charged up, each capacitor also becomes charged. When a turning signal is received by the terminal a, as will later be described, the thyristor SCR1 is turned on by a discharging current flowing through the discharging path of capacitor CT1-terminal a-terminal c-resistor R3-control electrode of SCR1-cathode of SCR1 and the charge of the capacitor CT2 is discharged. As the result, the xenon tube Xe becomes ionized by a voltage induced in the secondary winding of the transformer T1. At this time, the charging voltage of the capacitor $C_M$ is induced in the cathode of the xenon tube, so that a voltage is applied to the control electrode of the thyristor SCR2 to turn on the thyristor SCR2, thus starting the light emission. When the thyristor SCR2 is turned on, the discharging path of the capacitor C5, namely, R12-Xe-SCR2-ZD, is formed and therefore, a predetermined voltage is produced across the Zener diode ZD. Thus, the integrating circuit starts integration and the phototransistor $PT_1$ receives a predetermined quantity of reflected light and, when the charging level of the capacitor C4 reaches a predetermined value, the transistor Tr is turned on to turn on the thyristor SCR4. Therefore, the charge of the capacitor C3 is discharged and the thyristor SCR3 is turned on by the induced voltage of the transformer T2. Thus, the charge of the commutation capacitor C1 applies a reverse voltage to SCR2 through SCR3, so that SCR2 becomes turned off, thereby stopping the light emission. If the terminals a and c of the mounting foot 7 of the strobo 1 are disposed at the positions of the tuning signal terminal and grounded terminal on the shoe of a versatile camera, the light adjusting strobo 1 itself may be used with various versatile cameras and the above-described light emission and light adjustment may be carried out.

Figure 5:
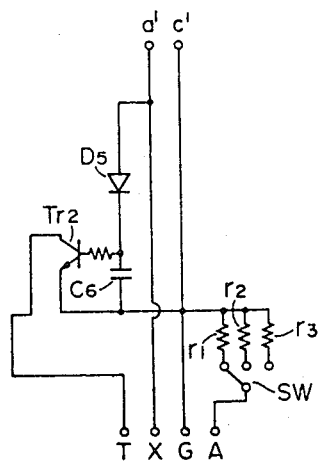
FIG. 5 is a diagram of the electric circuit of the FIG. 1 adapter.

FIG. 5 diagrammatically shows the electric circuit provided in the adapter 2. It includes a shutter time change-over signal forming transistor Tr2 and aperture signal forming type resistors r1–r3 which may form aperture signals of the levels corresponding to the aperture F2.8, 4 and 5.6 by a switch Sw operatively associated with the change-over knob 8.

Figure 6:
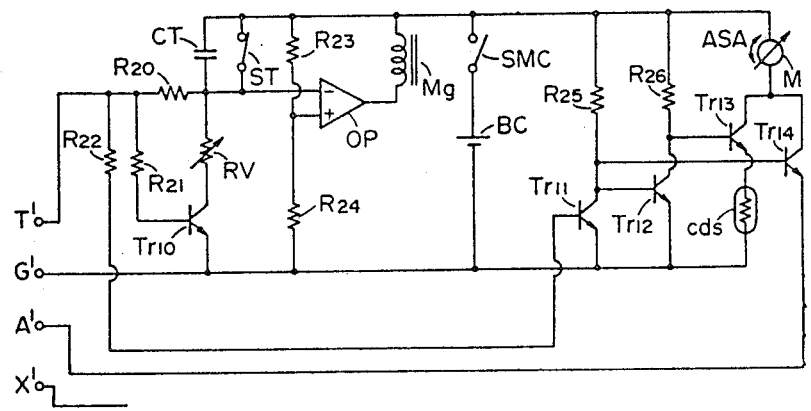
FIG. 6 is a diagram of the electric circuit in an embodiment of the exclusive camera with which the strobo and adapter of FIG. 1 are used.

FIG. 6 exemplarily shows an exposure control circuit on the exclusive camera side using the adapter 2. It includes a resistor R20 for adjusting the flash photography shutter time, for example, 1/90 sec., a variable resistor $R_V$ for a preferentially set shutter time, a time limit capacitor $C_T$, a start switch $S_T$ adapted to be opened during the starting of the forward curtain of the shutter, an operational amplifier OP, a rearward curtain holding magnet Mg, a main switch SMc, a battery Bc, an object light receiving photoconductive element CdS, and an aperture determining meter M which is operatively associated with a conventional saw-tooth mechanism to automatically determine the aperture opening. Designated by R21 and R22 are high resistance resistors, and denoted by R23–R26 are resistors. In the above-described construction, when the light adjusting strobo 1 is attached to the adapter 2 and the assembly is attached to the mounting shoe (not shown) of an exclusive camera, the terminals T, X, G and A of the adapter 2 are brought into contact with the terminals T', X', G' and A' of the camera. When the switch SMC of the camera is closed, the magnet Mg becomes electrically energized to hold the rearward curtain of the shutter. On the other hand, when the main switch $S_M$ of the strobo 1 is closed, the charging of the aforementioned capacitor of the strobo is started. When the main capacitor $C_M$ has been charged up, the voltage induced in the resistor R2 due to the turn-on current of the neon tube Ne charges a capacitor C6 connected to the transistor Tr2 of the adapter 2 through terminals a-a' and, when the charge of the capacitor C6 reaches a predetermined level, the transistor Tr2 is turned on. As the result, the voltage level at the terminal T is varied to the ground level and this variation signal is applied as the shutter time signal to a transistor Tr10 through the terminal T' to turn off this transistor and therefore, the set shutter time resistor $R_V$ becomes inoperative. On the other hand, a transistor Tr11 is turned off, a transistor Tr13 is turned off and a transistor Tr14 is turned on, and the meter M and the photoconductive element CdS are disconnected from each other, and one of the resistor r1–r3 is connected to the meter M through the terminals A-A'. Thus, when the charging of the strobo 1 has been completed, the shutter time of the camera is set to the flash photography shutter time by the resistor R20 and the designated aperture value information set by the change-over knob 8 of the adapter 2 is transmitted to the camera side by one of the resistors r1–r3 through the terminals A-A'. As the result, the meter M presents an amount of deflection corresponding to the predetermined aperture value and the aperture is automatically adjusted to the predetermined aperture value by a conventional aperture determining mechanism.

When a shutter release button (not shown) is depressed and the forward shutter curtain starts to open, the switch ST is opened to start to charge the capacitor CT through the resistor R20 and the voltage level at the inverting terminal of the operational amplifier OP is lowered. In the meantime, when the forward shutter curtain becomes fully open, the tuning contact, not shown, is closed to thereby operate the trigger circuit of the strobo 1 through the terminals X'-X and a'-a and the xenon tube emits light, as described above. By the light emission of the xenon tube, a predetermined voltage is produced in the Zener diode ZD to start the integrating operation of the integration circuit PT1, C4. When a predetermined quantity of reflected light from the object is received through the light-receiving opening 9, SCR4 is turned on and the thyristor SCR3 is turned on by the voltage induced in the secondary winding of the transformer T2, and SCR2 is turned off by the action of the commutation capacitor C1, thus stopping the light emission of the xenon tube.

Thereafter, the voltage at the terminal of the time limit capacitor CT of the camera lowers to a predetermined value, so that the operational amplifier is inverted and the magnet Mg is deenergized and thus, the holding of the rearward shutter curtain is released to close the shutter. Accordingly, on the camera side, exposure is effected with a shutter time and aperture value suitable for flash photography.

Unless the neon tube Ne is turned on or if the adapter 2 is removed from the camera, transistors Tr10 and Tr13 become turned on and therefore, natural light proper exposure photography with the camera's shutter set to the shutter time set by the resistor $R_V$ and with the aperture set to the aperture value determined by the CdS element. In front of the CdS element, there is provided a filter or the like whose quantity of light is variable in accordance with the set shutter time and the setting of the film speed is effected by rotating the body of the meter M, but the details thereof need not be described.

The foregoing embodiment has been described with respect to a case where the strobo 1 and the adapter 2 and the adapter 2 and the camera are integrally mounted by means of the mounting foot and shoe, whereas one or both of these coupling portions may be connected by a cable and this is better suited in the case of a grip type strobo.

Figure 7:
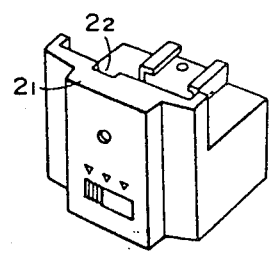
FIGS. 7 to 9 show another embodiment of the present invention, FIG. 7 being a view showing the construction of the entire adapter, FIG. 8 being a fragmentary top plan view of the adapter and strobo, and FIG. 9 being a cross-sectional view of essential portions showing the strobo as mounted to the adapter.
Figure 8:
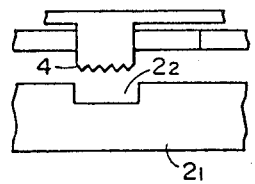
Figure 9:
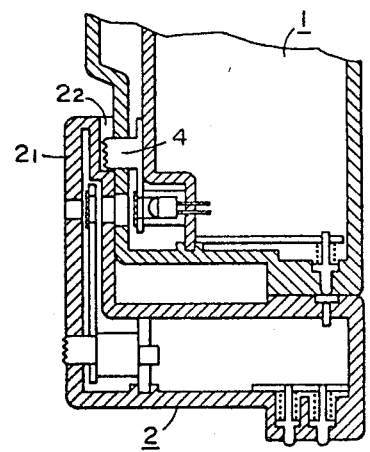

FIGS. 7 to 9 show another embodiment of the present invention in which the strobo 1 is not completely mounted to the adapter 2 unless the knob 4 of the strobo 1 is set at the position whereat the adapter is used, namely, the position of the aperture 2,8. In FIG. 7, a cut-away $2_2$ is provided in the front wall $2_1$ (see FIG. 8) opposed to the change-over knob 4 of the strobo 1 and in the above-described set position, the strobo 1 is completely mounted in the adapter 2 (see FIG. 9). The foregoing embodiment has been described with respect to the case of a camera of the shutter first type, but the embodiment is of course applicable also to an exclusive camera of the aperture first type or of the shutter and aperture first type and may be designed so that only the shutter time signal or only the aperture signal is formed in the adapter. Where only the aperture signal is formed in the adapter, the resistors r1–r3 may be series-connected to the collector of the transistor Tr2, for example, in the adapter circuit shown in FIG. 5.

Also, in the foregoing embodiment, various auto set signals are formed by the charging completion signal of the main capacitor, but it is also possible to receive only the main switch ON signal of the strobo and utilize such signal instead of the charging completion signal and in this case, various constructions which will match the exclusive camera may be adopted.

Specific embodiments of the present invention will hereinafter be described by reference to the drawings. FIGS. 10–15 like the above-described embodiment, shows an example of the construction of a light adjusting strobo and adapter, the strobo being one provided by slightly changing the terminal portion of a versatile light adjusting strobo and rendering such strobo into an exclusive strobo for an exclusive camera. In FIG. 10, reference numeral 101 designates the light adjusting strobo and reference numeral 102 designates the adapter. Designated by 103 is the light-emitting portion of the light adjusting strobo, and designated by 104 is a designated aperture value setting change-over knob. The knob $104_1$ may be slidden with respect to index marks on the housing to shift the light adjusting level, for example, to three stages of F2.8, 4 and 5.6. Designated by 105 is a reflected light receiving portion, and denoted by 106 is a battery containing lid.

As shown in FIG. 11, a shoe mounting foot 107 is secured to the bottom surface of the strobo 101 and is provided with terminals a, b, c and d. The terminal a is a power supply terminal, the terminal b is a charging completion detection signal and tuning trigger terminal, the terminal c is a grounded terminal and the terminal d is a light emission stopping signal terminal. Details of these terminals will be described later. Reference numeral 108 designates a designated aperture setting change-over knob provided on the front face of the adapter 102. Like the change-over knob 104, by sliding the knob $108_1$ to coincide with the fixed index mark, the designated aperture may be set to F2.8, 4 and 5.6 from left. Designated by 109 is a reflected light receiving portion provided in the adapter 102. The adapter 102 has a shoe to which the mounting foot 107 may be fitted, and also has electrode terminals a'-d' which are adapted to be opposed to and contacted by the terminals a-d during the mounting of the adapter.

The terminal c' serves also as the channel member of the shoe. The light adjusting strobo 101, as will later be described, is one provided by slightly changing a versatile light adjusting strobo and changing the mounting foot thereof into the mounting foot 107 additionally provided with the high voltage terminal a and the light emission stopping signal terminal d from the terminal of the main capacitor.

FIG. 12 is a cross-sectional view of essential portions showing the relation between the strobo 101 and the adapter 102 when the former is mounted to the latter. Since the reflected light receiving portion 105 of the strobo 101 is completely shielded from light by the back wall $102_1$ of the adapter 102 so that the light from outside is intercepted, the light receiving phototransistor $PT_1$ of the strobo 101 is shielded from light.

In this case, the light-receiving portion 109 of the adapter 102 is disposed just in opposed relationhip with the light-receiving portion 105, and a photo-transistor $PT_2$ receiving the reflected light through an opening of the light-receiving portion 109 becomes operative. F1 and F2 designate ND filters which may be slidden in front of the photo-transistors $PT_1$ and $PT_2$ in response to the change-over knobs $104_1$ and $108_1$, respectively and whose density is variable in three stages when the knobs are set to each index mark. Designated by 110 is a shoe mounting foot provided on the bottom surface of the adapter 102. The shoe mounting foot 110 is so shaped as to fit to the shoe of the camera on which the adapter 102 is mounted, and has signal terminals corresponding in number to the exclusive cameras with which the adapter 102 may be used. In the present embodiment, as will later be described, a camera in which a shutter time change-over signal and an aperture information signal are received from the adapter side so that the shutter time and the aperture value are automatically set is used as the exclusive camera and therefore, four terminals in total including the tuning contacts and the grounded terminals are exposed and they are disposed so as to correspond with the terminals of the exclusive camera.

Figure 13:
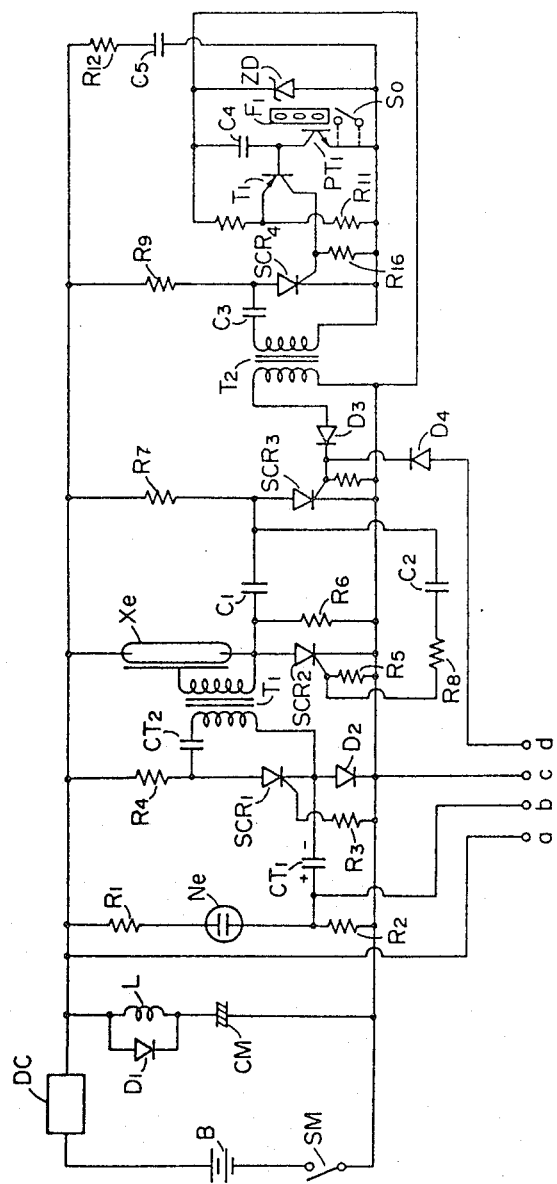
FIG. 13 is a diagram of the electric circuit of the FIG. 10 strobo.

FIG. 13 shows the electric circuit of the light adjusting strobo 101 shown in FIG. 10. It includes a power supply battery B, a main switch SM, a boosting DC converter DC, a diode D1, a coil L, a main capacitor CM, voltage dividing resistors R1, R2, a neon tube Ne, a capacitor $CT_1$ for triggering SCR1, a thyristor SCR1 for triggering a xenon tube, a trigger transformer T1, a xenon tube Xe, a light adjusting thyristor SCR2, a commutation capacitor C1, a capacitor C2 for triggering the thyristor SCR2, a light emission stopping thyristor SCR3, a transformer T2 for triggering SCR3, a capacitor C3 for triggering SCR3, a thyristor SCR4 for triggering SCR3, a reflected light integrating capacitor C4, and resistors R3-R12. When the switch SM is closed, the converter DC is operated and the output voltage thereof starts to charge the capacitor CM. When the capacitor CM has been charged up, the neon tube Ne is turned on so that the capacitor $CT_1$ is charged by the voltage induced in the resistor R2 due to the turn-on current, through a diode D2. The trigger capacitor $CT_2$ is charged through the resistor R4 and the diode D2 while, on the other hand, the commutation capacitor C1 is charged through the charging path of resistor R7-C1-resistor R6, the capacitor C2 is charged through the charging path of resistor R7-C2-resistor R8 and the capacitor C3 is charged through the charging path of resistor R9-C3-transformer T2-Zener diode ZD, so that when the main capacitor CM has been charged up, each capacitor becomes charged. As will hereinafter be described, when a tuning signal is received by the terminal b, SCR1 is turned on by a discharging current flowing through the discharging path of capacitor $CT_1$-terminal b-terminal c-resistor R3-control electrode of SCR1-cathode of SCR1, and the charge of the capacitor CT2 is discharged. As the result, the xenon tube Xe becomes ionized by the voltage induced in the secondary winding of the transformer T1. At this time, the charging voltage of the capacitor CM is induced in the cathode of the xenon tube, so that a voltage is applied to the control electrode of SCR2 and SCR2 is turned on, thus starting the light emission. When SCR2 is turned on, the discharging path of the capacitor C5, namely, R12-Xe-SCR2-ZD, is formed and therefore, a predetermined voltage is produced across the Zener diode ZD. Thus, the integration circuit starts integration and the phototransistor PT1 receives a predetermined quantity of reflected light and, when the charging level of the capacitor C4 reaches a predetermined value, a transistor Tr is turned on to turn on SCR4. Therefore, the charge of the capacitor C3 is discharged and SCR3 is turned on by the induced voltage of a transistor T2. Thus, the charge of the commutation capacitor C1 applies a reverse voltage to SCR2 through SCR3, so that SCR2 is turned off to stop the light emission.

If the terminals b and c of the mounting foot 107 of the strobo 101 are disposed at the positions of the tuning signal terminal and the grounded terminal on the shoe of a versatile camera, the light adjusting strobo 101 itself may be used with various versatile cameras to accomplish the light emission and light adjustment as described above.

Figure 14:
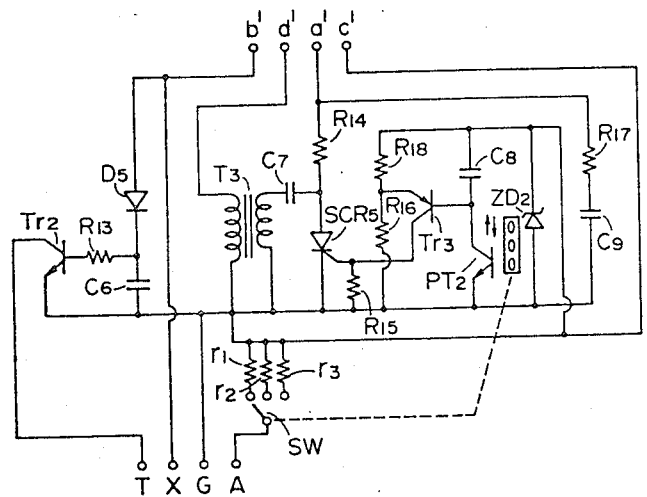
FIG. 14 is a diagram of the electric circuit of the FIG. 10 adapter.

FIG. 14 shows an electric circuit provided in the adapter 102. It includes a shutter time change-over signal forming transistor Tr2, a transformer T3 for triggering SCR3, and a thyristor SCR5 corresponding to SCR4. The circuit elements ZD, C4, PT1, Tr, SCR4 and T2 of the light adjusting circuit correspond to ZD2, C3, PT2, Tr3, SCR5 and T3, respectively, and together form the light adjusting circuit of the adapter 102. Designated by r1–r3 are aperture signal forming tap resistors which form aperture signals of the levels corresponding to the aperture values F2.8, 4 and 5.6, by a switch Sw operatively associated with the change-over knob 108.

Figure 15:
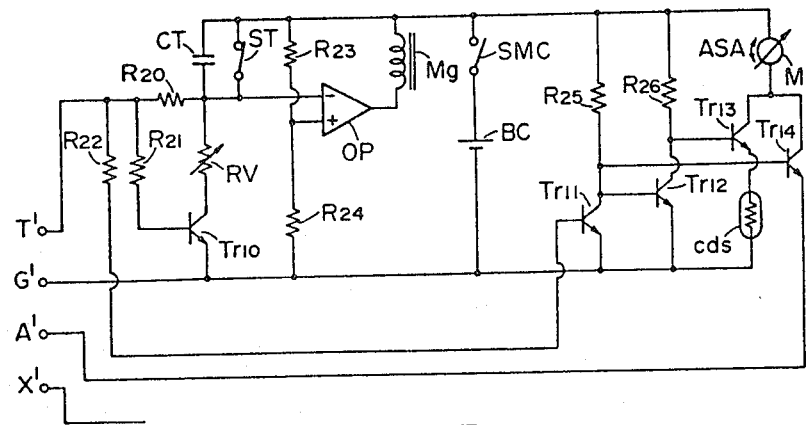
FIG. 15 is a diagram of the electric circuit in an embodiment of the exclusive camera with which the strobo and adapter of FIG. 10 are used.
Figure 16:
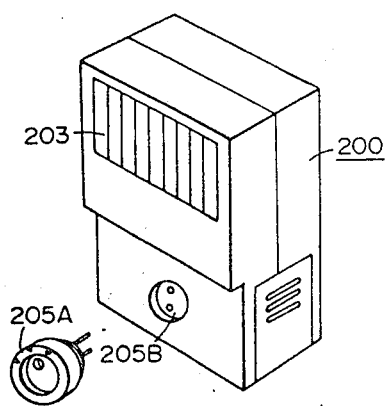
FIGS. 16-19 show a modification of the adapter according to the present invention, FIG. 16 being a view showing the construction of the entire strobo to be applied to the adapter, FIG. 17A being a view showing the construction of the adapter, FIG. 17B being a bottom view of the FIG. 17A adapter, FIG. 18 being a cross-sectional view of essential portions showing the FIG. 16 strobo as mounted to the FIG. 17 adapter, and FIG. 19 being a view showing the construction of the light-receiving unit of the FIG. 16 strobo.

FIG. 15 exemplarily shows the exposure control circuit of the exclusive camera using the adapter 102. It includes a resistor R20 for adjusting the flash photography shutter time, for example 1/90 sec., a variable resistor $R_V$ for a preferentially set shutter time, a time limit capacitor CT, a start switch ST adapted to be opened when the forward curtain of the shutter starts, an operational amplifier OP, a rearward curtain holding magnet Mg, a main switch SMc, a battery Bc, an object light receiving photoconductive element CdS, and an aperture determining meter M which has a pointer a portion of which is adapted to deflect in opposed relationship with the aperture scale plate in the finder to indicate the aperture value and which is operatively associated with a conventional saw-tooth mechanism to automatically determine the aperture opening. R21 and R22 are high resistance resistors, and R23–R26 are resistors.

In the above-described construction, when the light adjusting strobo 101 is mounted to the adapter 102 and the assembly is mounted to the mounting shoe (not shown) of an exclusive camera, the terminals T, X, G and A of the adapter 102 are contacted by the terminals T', X', G' and A' of the camera. When the switch SMc of the camera is closed, the magnet Mg becomes electrically energized to hold the rearward curtain of the shutter. On the other hand, when the main switch SM of the strobo 101 is closed, the capacitor of the strobo starts to be charged. The main capacitor starts to be charged. When the main capacitor CM has been charged up, the voltage induced in the resistor R2 due to the turn-on current of the neon tube Ne charges a capacitor C6 connected to the transistor Tr2 of the adapter 102 through terminals b-b' and, when the charge of the capacitor C6 reaches a predetermined level, the transistor Tr2 is turned on. As the result, the level of the voltage at the terminal T is varied to the ground level and this variation signal is applied as the shutter time signal to the transistor Tr10 through the terminal T' to turn off the transistor Tr10, so that the set shutter time resistor $R_V$ becomes inoperative. On the other hand, the transistor Tr11 is turned off, the transistor Tr13 is turned off and the transistor Tr14 is turned on, and the meter M and the photoconductive element CdS are disconnected from each other and one of the resistors r1–r3 is connected to the meter M through the terminals A-A'. Accordingly, when the charging of the strobo 101 is completed, the shutter time of the camera is set to the flash photography shutter time by the resistor R20 and the designated aperture value information set by the change-over knob 108 of the adapter 102 is transmitted to the camera side by one of the resistors r1–r3 through the terminals A-A'. As the result, the meter M presents an amount of deflection corresponding to the predetermined aperture value and the pointer of the meter is indicated in the finder of the camera while the aperture is automatically adjusted to the predetermined aperture value by a conventional aperture determining mechanism.

When a shutter release button (not shown) is depressed and the forward shutter curtain starts to open, the switch ST is opened to start to charge the capacitor CT through the resistor R20 and the voltage level at the inverting terminal of the operational amplifier OP is lowered. In the meantime, when the forward shutter curtain becomes fully open, the tuning contact, not shown, is closed to thereby operate the trigger circuit of the strobo 101 through the terminals X'-X and b'-b and the xenon tube emits light, as described above.

By the light emission of the xenon tube, a predetermined voltage is produced in the Zener diode ZD2 of the adapter 102 to start the integrating operation of the integration circuit PT2, C3. When a predetermined quantity of reflected light from the object is received by the light-receiving portion of the adapter, SCR5 is turned on and the thyristor SCR3 of the strobo 101 is turned on by the voltage induced in the secondary winding of the transformer T3, and SCR2 is turned off by the action of the commutation capacitor C1, thus stopping the light emission of the xenon tube.

Thereafter, the voltage at the terminal of the time limit capacitor CT of the camera lowers to a predetermined value, so that the operational amplifier is inverted and the magnet Mg is deenergized and thus, the holding of the rearward shutter curtain is released to close the shutter. Accordingly, on the camera side, exposure is effected with a shutter time and aperture value suitable for flash photography.

Unless the neon tube Ne is turned on or if the adapter 102 is removed from the camera, transistors Tr10 and Tr13 become turned on and therefore, natural light proper exposure photography with the camera's shutter set to the shutter time set by the resistor $R_V$ and with the aperture set to the aperture value determined by the CdS element. In front of the CdS element, there is provided a filter or the like whose quantity of light is variable in accordance with the set shutter time and the setting of the film speed is effected by rotating the body of the meter M, but the details thereof need not be described.

The foregoing embodiment has been described with respect to a case where the strobo 101 and the adapter 102 and the adapter 102 and the camera are integrally mounted by means of the mounting foot and shoe, whereas one or both of these coupling portions may be connected by a cable and this is better suited in the case of a grip type strobo.

Also, as the means for rendering the light adjusting circuit of the strobo inoperative, instead of shielding the light-receiving portion from light, a switch So may be provided in the integration circuit of the phototransistor PT1 of FIG. 13 and the switch So may be opened in response to the mounting of the adapter 102, or in response to the device of the cable, or manually, thereby rendering said light adjusting circuit inoperative.

Further, the foregoing embodiment has been described with respect to the case where the mounting foot portion of the versatile strobo has been reformd, whereas if only the light-receiving element PT2 is provided on the adapter 102 side in the light adjusting circuit (FIG. 14) of the adapter 102 and a terminal for parallel-connecting such element PT2 to the element PT1 of the strobo is connected by the mounting foot or by a cable separate from the mounting foot, then it will be possible to use a versatile strobo with the present embodiment by a further simple improvement.

Figure 17A:
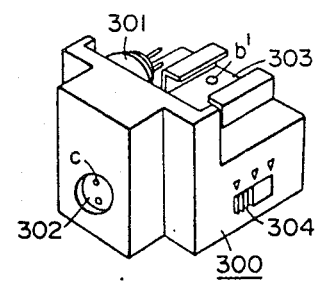
Figure 17B:
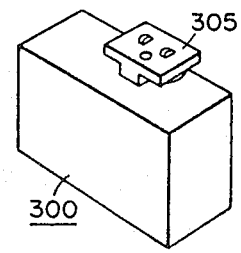
Figure 18:
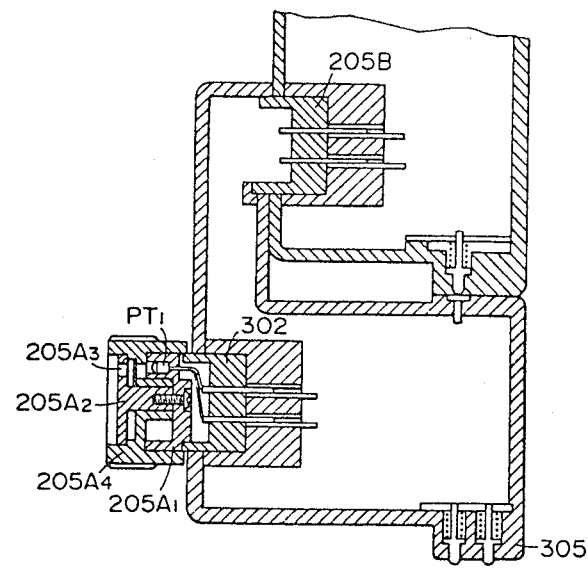
Figure 19:
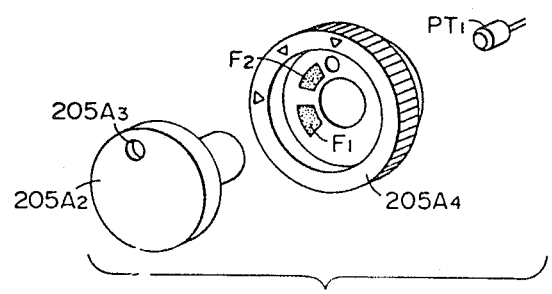

FIGS. 16-19 show a modification of the above-described embodiment. This modification includes a strobo 200, a light-receiving portion 203, a light-receiving unit 205A removably mountable to the strobo 200, and an insertion socket 205 of the light-receiving unit. The light-receiving unit 205A is designed so that the reflected object light impinges on the phototransistor PT1 through the opening 205A3 of an opening plate 205A2 screwed to a base plate 205A1 carrying thereon the phototransistor, as shown in FIGS. 18 and 19, and a designated aperture setting change-over knob 205A4 is rotatably provided between the base plate 205A1 and the opening plate 205A3.

As shown in FIG. 19, the change-over knob 205A4 is formed with three openings and ND filters F1 and F2 having different densities are attached to two of the three openings. By rotating the change-over knob 205A4, one of the index marks on the knob 205A4 may be registered to the opening 205A3 to thereby set three aperture values F2.8, 4 and 5.6.

The adapter 300 is shown in FIGS. 17A and 17B and, during the mounting of the strobo 200, a terminal unit 301 is projected at a position opposed to the insertion socket 205B. Designated by 302 is the light-receiving unit insertion socket of the adapter, and denoted by 303 is a strobo mounting shoe. On the shoe 303, the X contact connecting terminal b' of the strobo mounting foot is projectedly provided. Designated by 304 is a camera side aperture signal setting knob. A predetermined aperture signal may be formed by registering the knob 304 to the aperture value set by the knob 205A4.

In this embodiment, the switch Sw shown in FIG. 14 is operatively associated with a filter plate, but the member corresponding to the switch Sw is replaced by the knob 304 and the member corresponding to the filter plate is replaced by the knob 205A4.

FIG. 17B shows a mounting foot 305 provided in the lower portion of the adapter 200. In the above-described construction, when the versatile strobo 200 is used with an exclusive camera, the light-receiving unit 205A is removed from the socket 205B and inserted into the adapter 300. When the mounting foot of the strobo 200 is mounted to the shoe 303 of the adapter 300, a terminal unit 301 is inserted into the insertion socket 205B of the strobo 200. As the result, the phototransistor PT1 of FIG. 13 slips out. On the other hand, when the light-receiving unit 205A is inserted into the socket 302 of the adapter 300, it is again connected to the phototransistor PT1 of FIG. 13 on the adapter side.

The details of the circuits of the strobo 200 and the adapter 300 are omitted herein. A designated aperture signal forming circuit r1-r3, Sw and a shutter time signal forming circuit Tr2, D5, C6 are provided in the adapter 300, and terminals b' and d' are parallel-connected to the mounting foot of the strobo 200 and the terminal of the socket 301 is parallel-connected to the terminal of the socket 302.

When the light-receiving unit 205A is inserted in the above-described manner and the adapter 300 is mounted to an exclusive camera, an operation similar to that of the above-described embodiment takes place and it need not be described.

Figure 20:
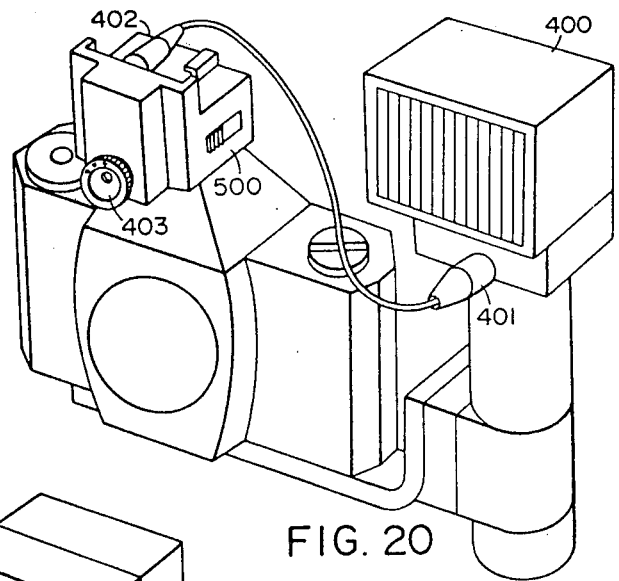
FIG. 20 shows the construction of a specific embodiment of the adapter using a cable.

FIG. 20 shows a modification in which the strobo and the adapter are connected together by a cable and in which the strobo used is a grip type strobo and a cable terminal 401 is inserted into the insertion socket of the light-receiving unit of the strobo 400 while the light-receiving unit 403 is inserted into the adapter 500 and a cable terminal 402 is inserted into the adapter. According to such a form of construction, the light-receiving unit can be disposed near the optic axis of the photographing lens of a camera, thus minimizing the reflected light metering error resulting from parallax.

The foregoing embodiment has been described with respect to an example of the shutter first type camera, but it is of course applicable also to exclusive cameras of the aperture first type or the shutter and aperture first type, and it may be designed such that only the shutter time signal or only the aperture signal is formed in the adapter. Where only the aperture signal is formed, resistors $r_1$-$r_3$ may be series-connected to the collector of the transistor $Tr_2$, for example, by the adapter circuit shown in FIG. 14.

In the above-described embodiment, various auto set signals are formed by the charging completion signal of the main capacitor, but it is also possible to receive only the main switch ON signal of the strobo and utilize such signal instead of the charging completion signal and in this case, various constructions which will match the exclusive camera may be adopted.

Figure 21:
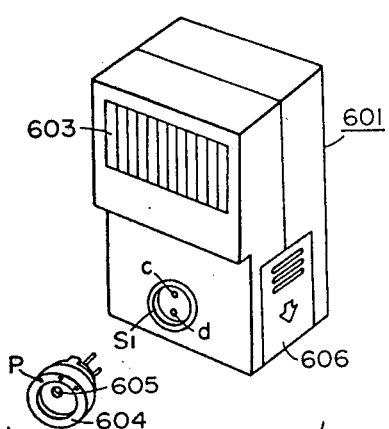
FIG. 21 is a perspective view of a strobo to which the present invention is applied.

A further embodiment of the present invention will hereinafter be described by reference to the drawings. FIGS. 21-26 show an example of the construction of the light adjusting strobo and adapter, the strobo being one provided by rendering a versatile light adjusting strobo into an exclusive strobo for an exclusive camera as already described. In FIG. 21, reference numeral 601 designates the light adjusting strobo and reference numeral 602 denotes the adapter. Designated by 603 is the light emitting portion of the light adjusting strobo. Denoted by P is a light receiving unit, and designated by 604 is a designated aperture valve setting change-over knob provided on the light receiving unit P. The knob 604 may be rotated with respect to index marks on the housing to shift the light adjusting level, for example, to three stages of aperture valves F 2.8, 4, and 5.6. Designated by 605 is a reflected light receiving opening, and denoted by 606 is a battery containing lid.

Figure 22:
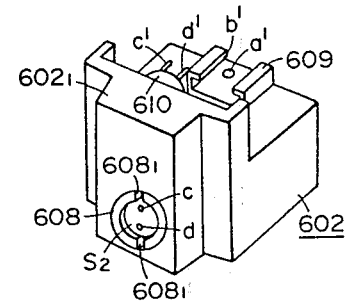
FIG. 22 shows the construction of an adapter used with the FIG. 21 strobo.
Figure 24:
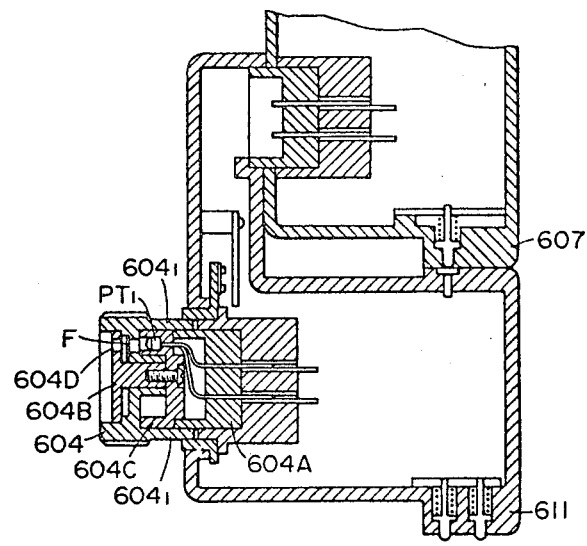
FIG. 24 is a cross-sectional view of essential portions showing the FIG. 21 strobo as mounted to the adapter.
Figure 25:
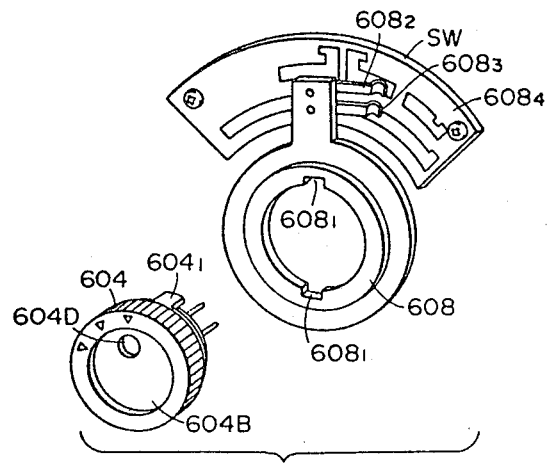
FIG. 25 shows the construction of the essential portions of the light-receiving unit shown in FIG. 24.

As shown in FIG. 24, a shoe mounting foot 607 is secured to the bottom surface of the strobo 601, and the strobo 601 is provided with terminals a, b, c and d. The terminal a is a trigger terminal, the terminal b is a grounded terminal, and the terminal d is a light receiving phototransistor connecting terminal. Details of these terminals will later be described. As shown in FIG. 24, the light-receiving unit P has its terminal embedded in an insulative base plate 604A, and the base plate 604A has an intermediate member secured thereto. The intermediate member 604C has secured thereto, by a screw, a front plate 604B having a light-receiving opening 604D (FIG. 25). A phototransistor $PT_1$ is secured to the intermediate member 604C behind the opening 604D. As shown in FIG. 25, reference numeral 608 designates a designated aperture signal interlocking ring provided in front of the adapter 602, and the rear end projection $604_1$ of the change-over knob 604 engages the cut-away $608_1$ of the ring 608 to establish an operative association therebetween. The interlocking ring 608 has movable contact pieces $608_2$ and $608_3$ forming a change-over switch SW to be described, and forms the switch SW with an electrode plate $608_4$. The change-over knob 604 is rotatably mounted on a portion of the light-receiving unit P to set the designated aperture to F2.8, 4 and 5.6 from left, and the light-receiving unit P is shown to be mounted on the adapter in FIG. 24. As shown in FIG. 22, the adapter 602 has a shoe 609 to which the mounting foot 607 may fit, and also has an electrode terminal a' opposed to and contacted by one of the terminals a–d during the mounting of the strobo 601. S designates a socket for dragging thereinto the light-receiving unit P. The terminal b' serves also as the channel member of the shoe, and the contact terminals c' and d' of the terminals c and d are provided on an insertion socket 610 formed in the rear surface of the front wall of the adapter 602.

FIG. 24 is a cross-sectional view of essential portions showing the relation between the strobo 601 and the adapter 602 when the former is mounted to the latter. The unit P is removed from the socket $S_1$ and inserted into a socket $S_2$ formed in the adapter 602. The socket $S_1$ for the reflected light receiving unit of the strobo 601 is inserted into an insertion socket 610 secured to the front wall of the adapter 602, to thereby couple the terminals c-c' and d-d'. The light-receiving phototransistor $PT_1$ which has been on the strobo 601 side is set to a usable condition on the adapter 602 side.

Figure 23:
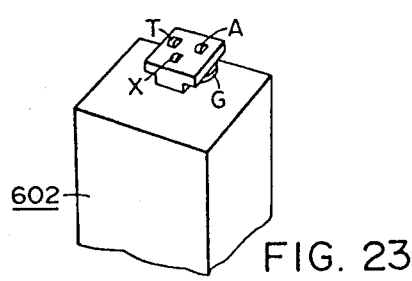
FIG. 23 is a perspective view of the bottom surface portion of the FIG. 22 adapter.

In operative association with the change-over knob 604, an ND filter having a different density is inserted in front of the phototransistor $PT_1$ and therefore, when the change-over knob 604 is set to each designated aperture valve, the quantity of light received by the light-receiving transistor $PT_1$ is adjusted in three stages. Designated by 611 is a shoe mounting foot provided on the bottom surface of the adapter 602. The shoe mounting foot 611 is so shaped as to fit to the camera's shoe to which the adapter 602 is mounted, and has signal terminals corresponding in number to the exclusive cameras with which the adapter 602 may be used. In the present embodiment, as will later be described, a camera in which a shutter time change-over signal and an aperture change-over signal are received from the adapter side so that the shutter time and the aperture valve are automatically set is used as the exclusive camera and therefore, as shown in FIG. 23, four terminals in total including the tuning contact terminal $\chi$, the grounded terminal G, the shutter time change-over information terminal T and the aperture information terminal A are exposed and they may be desposed so as to correspond with the terminals of the exclusive camera.

Figure 26:
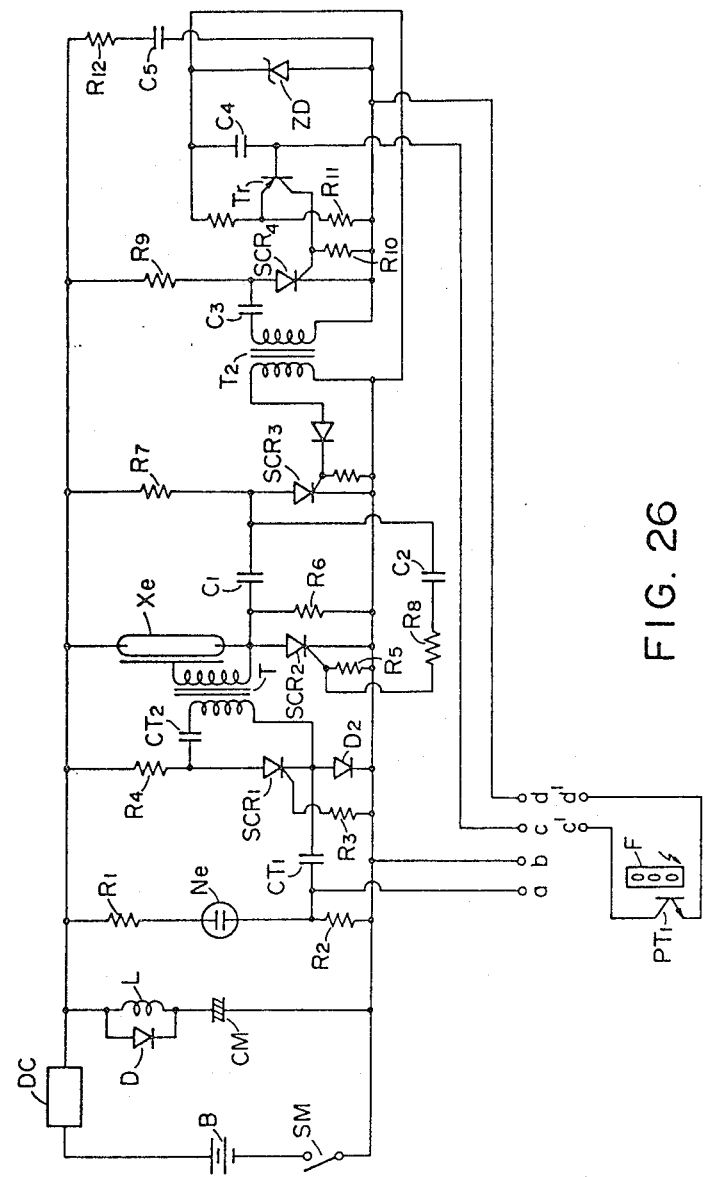
FIG. 26 is a diagram of the electric circuit of the FIG. 21 strobo.

FIG. 26 shows the electric circuit of the light adjusting strobo 601 shown in FIG. 21. It includes a power supply battery B, a main switch SM, a boosting DC converter DC, a diode D, a coil L, a main capacitor CM, voltage dividing resistors $R_1$, $R_2$, a neon tube Ne, a triggering capacitor $CT_1$, a triggering thyristor $SCR_1$, a capacitor $CT_2$ for triggering a xenon tube, a transformer $T_1$ for triggering the xenon tube, a xenon tube Xe, a light adjusting thyristor $SCR_2$, a commutation capacitor $C_1$, a capacitor $C_2$ for triggering the thyristor $SCR_2$, a light emission stopping thyristor $SCR_3$, a transformer $T_2$ for triggering $SCR_3$, a capacitor $C_3$ for triggering $SCR_3$, a thyristor $SCR_4$ for triggering $SCR_3$, a reflected light integrating capacitor $C_4$ and resistors $R_3$–$R_{12}$. When the switch SM is closed, the converter DC is operated and a high tension output voltage starts to charge the capacitor CM. When the capacitor CM has been charged up, the neon tube Ne is turned on so that the capacitor $CT_1$ is charged through a diode $D_2$ by a voltage induced in the resistor $R_2$ due to the turn-on current. The trigger capacitor $CT_2$ is charged through the resistor $R_4$ and a diode $D_1$ while, on the other hand, the commutation capacitor $C_1$ is charged through the charging path of resistor $R_7$-$C_1$- resistor $R_6$, the capacitor $C_2$ is charged through the charging path of resistor $R_7$-$C_2$-resistor $R_8$, and the capacitor $C_3$ is charged through the charging path of resistor $R_9$-$C_3$-transformer $T_2$-Zener diode ZD and therefore, when the main capacitor CM has been charged up, each capacitor also becomes charged. As will later be described, when a tuning signal is received from a terminal a, $SCR_1$ is turned on by the discharging current flowing through the discharging path of capacitor $CT_1$-terminal a-terminal b-resistor $R_3$-control electrode of $SCR_1$-cathode of $SCR_1$, so that the charge of the capacitor $CT_2$ is discharged. As the result, the xenon tube $\chi$e becomes ionized by the voltage induced in the secondary winding of the transformer $T_1$. In this case, the charging voltage of the capacitor CM is induced in the cathode of the xenon tube and therefore, a voltage is applied to the control electrode of $SCR_2$ to turn on $SCR_2$, thus starting the light emission. When $SCR_2$ is turned on, there is formed the discharging path of the capacitor $C_5$, namely, $R_{12}$-$\chi$e-$SCR_2$-ZD, so that a predetermined voltage is produced across the zener diode ZD. Therefore, the integration circuit starts the integration and the phototransistor $PT_1$ receives a predetermined quantity of reflected light and, when the charging level of the capacitor $C_4$ reaches a predetermined valve, the transistor is turned on to turn on $SCR_4$. Thus, the charge of the capacitor $C_3$ is discharged and $SCR_3$ is turned on by the induced voltage of the transformer $T_2$. Thus, the charge of the commutation capacitor $C_1$ applies a reverse voltage to $SCR_2$ through $SCR_3$ to thereby turn off $SCR_2$, thus stopping the light emission.

Figure 27:
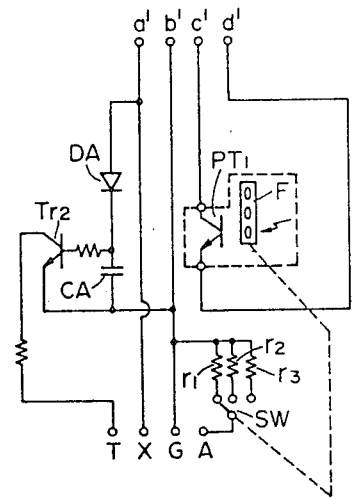
FIG. 27 is a diagram of the electric circuit of the FIG. 22 adapter.

FIG. 27 shows the electric circuit provided in the adapter 602. In FIG. 27, $Tr_2$ designates a shutter time changeover signal forming transistor, DA designates a diode and CA denotes a charging completion signal holding capacitor. Designated by $r_1$–$r_3$ are aperture signal forming tap resistors. In response to an interlocking ring 608 operatively associated with the change-over knob 604, the resistors $r_1$–$r_3$ form aperture signals of the levels corresponding to the aperture valves 2.8, 4 and 5.6, by the switch SW and at the same time, the setting of the light adjusting level of the light adjusting circuit in the strobo is also effected.

Figure 28:
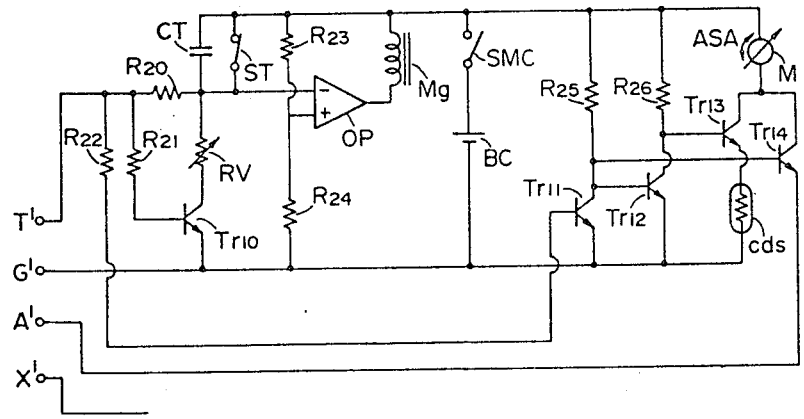
FIG. 28 is a diagram of the electric circuit in an embodiment of the exclusive camera with which the FIG. 26 circuit and the FIG. 27 circuit are used.

FIG. 28 exemplarily shows the exposure control circuit of the exclusive camera using the adapter 602. It includes a resistor $R_{20}$ for adjusting the flash photography shutter time, for example, 1/90 sec., a variable resistor Rv for a preferentially set shutter time, a time limit capacitor $C_T$, a start switch $S_T$ adapted to be opened during the starting of the forward shutter curtain, an operational amplifier OP, a magnet Mg for holding the rearward shutter curtain, a main switch SMc, a battery Bc, an object light receiving photoconductive element CdS, and an aperture determining meter M operatively associated with a conventional saw-tooth mechanism to automatically determine the aperture opening. $R_{21}$ and $R_{22}$ are high resistance resistors, and $R_{23}$–$R_{26}$ are resistors.

In the above-described construction, when the light adjusting strobo 601 is mounted to the adapter 602 and the assembly is mounted to the mounting shoe (not shown) of an exclusive camera, the terminals T, $\chi$, G and A of the adapter 602 are contacted by the terminals T', $\chi$', G' and A' of the camera. The change-over knob 604 of the light receiving unit mounted to the adapter 602 is operated to register the index mark to a designated aperture valve. Thereafter, when the switch SMC of the camera is closed, the magnet Mg becomes electrically energized to hold the rearward curtain of the shutter. On the other hand, when the main switch SM of the strobo 601 is closed, the charging of the capacitor of the strobo is started. When the main capacitor CM has been charged up, the voltage induced in the resistor $R_2$ due to the turn-on current of the neon tube Ne charges a capacitor $C_4$ connected to the transistor $Tr_2$ of the adapter 602 through terminals b-b' and, when the charge of the capacitor $C_4$ reaches a predetermined level, the transistor $Tr_2$ is turned on. As the result, the voltage at the terminal T is varied in level to the ground level and this variation signal is applied as a shutter time signal to a transistor $Tr_{10}$ through the terminal T' to turn off this transistor, so that the set shutter time resistor Rv becomes inoperative. On the other hand, a transistor $Tr_{11}$ is turned off, a transistor $Tr_{13}$ is turned off and a transistor $Tr_{14}$ is turned on, so that the meter M and the photoconductive element CdS are disconnected from each other and one of the resistors $r_1$-$r_3$ is connected to the meter M through terminals A-A'. Accordingly, when the charging of the strobo 601 is completed, the camera's shutter time is set to the flash photography shutter time by the resistor $R_{20}$, and the designated aperture value information set by the change-over knob 604 of the adapter 602 is transmitted to the camera side by one of the resistors $r_1$-$r_3$ through terminals A-A'. As the result, the meter M presents an amount of deflection corresponding to the predetermined aperture value and the aperture is automatically adjusted to a predetermined aperture value by a conventional aperture determining mechanism. In this case, design may be made such that, as in the above-described embodiment, the meter needle is displayed in the finder to indicate the aperture valve.

When the shutter release button (not shown) is depressed and the forward shutter curtain starts to open, the switch $S_T$ is opened and the charging of the capacitor $C_T$ is started through the resistor $R_{20}$, so that the level of the inverting terminal of the operational amplifier OP is lowered. In the meantime, when the forward shutter curtain becomes fully open, the tuning contact, not shown, is closed, so that the trigger circuit of the strobo 601 is operated through terminals X'-X and a'-a and the xenon tube emits light as described above. By the light emission of the xenon tube, a predetermined voltage is produced in the zener diode ZD and the integrating operation of the phototransistor $PT_1$ is inserted in the adapter 602 side is started. When a predetermined quantity of reflected light from the object is received by the light-receiving portion of the adapter, $SCR_4$ is turned on and the thyristor $SCR_4$ of the strobo 601 is turned on by the voltage induced in the secondary winding of the transformer $T_3$, and $SCR_2$ is turned off by the action of the commutation capacitor $C_1$, thus stopping the light emission of the xenon tube.

Thereafter, the voltage at the terminal of the time limit capacitor CT of the camera lowers to a predetermined value and therefore, the operational amplifier is inverted to deenergize the magnet Mg, so that the holding of the rearward shutter curtain is released and the shutter closes. Accordingly, on the camera side, exposure is effected with a shutter time and aperture value suitable for the flash photography.

Unless the neon tube Ne is turned on or if the adapter 602 is removed from the camera, transistors $Tr_{10}$ and $Tr_{13}$ are turned on and therefore, natural light proper exposure photography is effected with the camera's shutter set to the shutter time set by the resistor $R_v$ and with the aperture value determined by the CdS element. A filter or the like whose quantity of light is varied in accordance with the set shutter time is provided in front of the CdS element and the setting of the film speed is accomplished by rotating the body of the meter M, but the details thereof are omitted herein.

The foregoing embodiment has been described with respect to a case where the strobo 601 and the adapter 602 and the adapter 602 and the camera side are integrally mounted by means of the mounting foot and shoe, whereas one or both of these coupling portions may be connected by a cable and this is better suited in the case of a grip type strobo.

As described above, the strobo used herein is one whose light-receiving element is detachable and therefore, when the strobo is mounted to the adapter with the light-receiving element detached therefrom, the connection electrode of the light-receiving element may be connected with the light-receiving element of the adapter and so, the light adjusting strobo may be used with the adapter without reforming the strobo in any way. In this case, it is of course possible to connect the strobo and the adapter by a cable. Although the foregoing embodiment has been described with respect to the shutter first type camera, it is of course applicable also to an aperture first type camera or a shutter and aperture first type camera and may be designed so that only the shutter time signal or only the aperture signal is formed in the adapter. Where only the aperture signal is formed in the adapter, the resistor $r_1$-$r_3$ may be series-connected to the collector of the transistor $Tr_2$, for example, in the adapter circuit shown in FIG. 5.

Also, in the foregoing embodiment, various auto set signals are formed by the charging completion signal of the main capacitor, but it is also possible to receive only the main switch ON signal of the strobo and utilize such signal instead of the charging completion signal and in this case, various constructions which will match the exclusive camera may be adopted.

The embodiment described below intends to provide an adapter for adapting a versatile strobo to a camera of the type in which, when an exclusive strobo is mounted to the camera, the shutter time is changed over to one for flash photography by the completion of the charging of the main capacitor of the strobo and a designated aperture value is displayed in the finder and the operator manually sets by seeing the displayed value.

Figure 29:
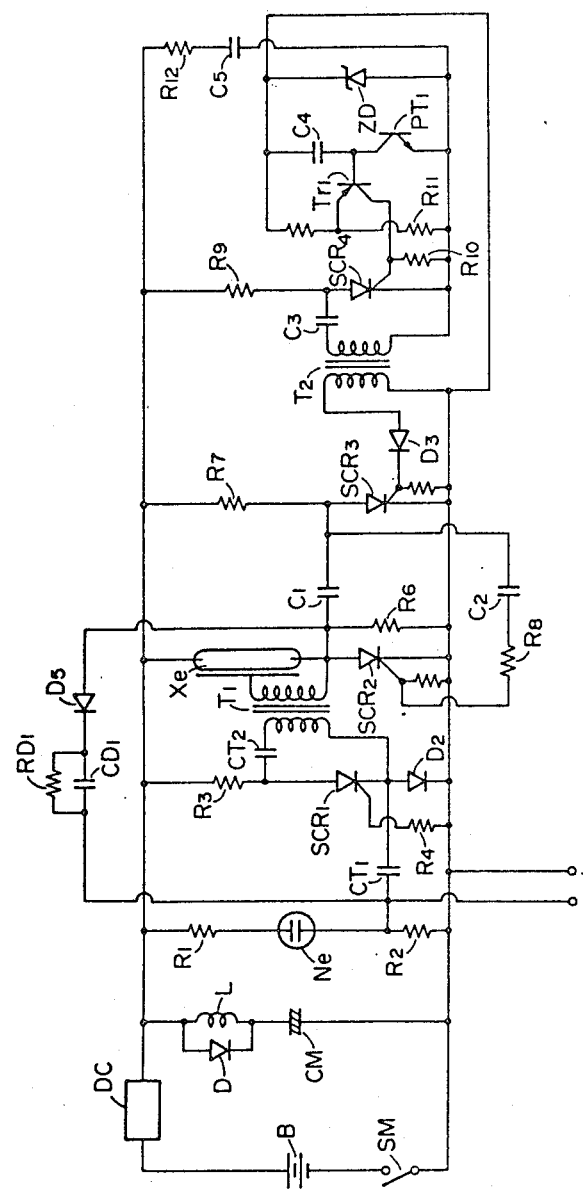
FIG. 29 is a diagram of the electric circuit of another strobo applied to the adapter according to the present invention.

As the versatile light adjusting strobo, use is made of a strobo which is usable with ordinary cameras and which has been slightly reformed so as to be adapted to the above-described camera and as will later be described in detail, consideration is given to the disposition of each trigger terminal and grounded terminal so that the strobo emits light in tuning relationship with various types of cameras. FIG. 29 shows the electric circuit of a light adjusting strobo having the function as such versatile strobo.

Designated by a and b are terminals attached to the housing (not shown) of the strobo. The terminal a is a trigger terminal and the terminal b is a grounded terminal. The terminals a and b are provided on the shoe mounting foot so that the terminal a electrically contacts a tuning contact usually provided, for example, on the center of the camera side accessory shoe of an ordinary camera and that the terminal b electrically contacts the channel portion of the shoe.

With such a construction, if the strobo is mounted to an ordinary camera, the tuning signal from the camera side may of course be received by the strobo side to enable the emission of flashlight.

FIG. 29 includes a power supply battery B, a main switch SM, a boosting DC converter DC, a diode D, a coil L, a main capacitor CM, voltage dividing resistors $R_1$, $R_2$, a neon tube Ne, a triggering capacitor $CT_1$, a triggering thyristor $SCR_1$, a capacitor $CT_2$ for triggering a xenon tube, a transformer $T_1$ for triggering the xenon tube, a xenon tube $\chi e$, a light adjusting thyristor $SCR_2$, a commutation capacitor $C_1$, a capacitor $C_2$ for triggering the thyristor $SCR_2$, a light emission stopping thyristor $SCR_3$, a transformer $T_2$ for triggering $SCR_3$, a capacitor $C_3$ for triggering $SCR_3$, a light adjusting thyristor $SCR_4$, a reflected light integrating capacitor $C_4$, a reflected object light receiving phototransistor $PT_1$, and resistors $R_3-R_{12}$. $RD_1$ and $CD_1$ are a resistor and a capacitor forming a differentiating circuit.

When the switch SM is closed, the converter DC is operated and a high tension output voltage starts to charge the capacitor CM. When the capacitor CM has been charged up, the neon tube Ne is turned on so that the capacitor $CT_1$ is charged through a diode $D_2$ by the voltage induced in the resistor $R_2$ due to the turn-on current. The trigger capacitor $CT_2$ is charged through the resistor $R_4$ and diode $D_2$ while, on the other hand, the commutation capacitor $C_1$ is charged through the charging path of resistor $R_7$-$C_1$ resistor $R_6$, the capacitor $C_2$ is charged through the charging path of resistor $R_7$-$C_2$-resistor $R_8$, and the capacitor $C_3$ is charged through resistor $R_9$-$C_3$-transformer $T_2$-zener diode ZD and therefore, when the main capacitor CM has been charged up, each capacitor also becomes charged. When a tuning signal is received from the terminal a as will later be described, $SCR_1$ is turned on by the discharging current flowing through the discharging path of capacitor $CT_1$-terminal a-terminal b-resistor $R_4$-control electrode of $SCR_1$-cathode of $SCR_1$, so that the charge of the capacitor $CT_2$ is discharged. As the result, the xenon tube Xe becomes ionized by the voltage induced in the secondary winding of the transformer $T_1$. At this time, the charging voltage of the capacitor CM is induced in the cathode of the xenon tube and therefore, a voltage is applied to the control electrode of $SCR_2$ and $SCR_2$ is turned on, thus starting the light emission. When $SCR_2$ is turned on, the discharging path of the capacitor $C_5$, namely, $\chi e$-$SCR_2$-ZD, is formed, so that a predetermined voltage is produced across the zener diode ZD. Thus, the integration circuit starts integration and the phototransistor $PT_1$ receives a predetermined quantity of reflected light and, when the charging level of the capacitor $C_4$ reaches a predetermined valve, a transistor $Tr_1$ is turned on to turn on $SCR_4$. Therefore, the charge of the capacitor $C_3$ is discharged and $SCR_3$ is turned on by the induced voltage of the transformer $T_2$. Thus, the charge of the commutation capacitor $C_1$ applies a reverse voltage to $SCR_2$ through $SCR_3$, so that $SCR_2$ becomes turned off, thus stopping the light emission.

Since, as already described, the terminals a and b of the strobo 1 are disposed at the positions of the tuning signal terminal and grounded terminal on the shoe of the versatile camera, the light adjusting strobo itself may be used with various versatile cameras to effect the light emission and light adjustment as described above.

Figure 30:
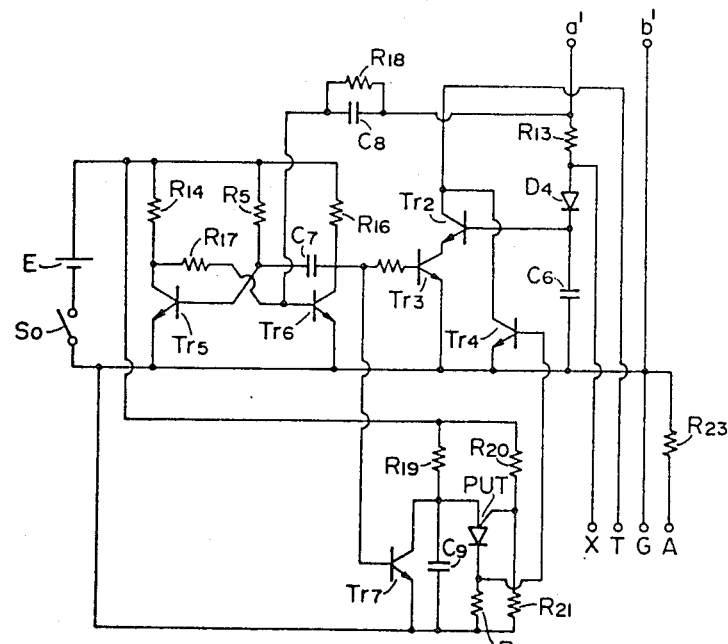
FIG. 30 is a diagram of the electric circuit in an embodiment of the adapter according to the present invention which is used with the FIG. 29 circuit.

FIG. 30 shows the electric circuit of an adapter usable with the above-described light adjusting strobo to adapt the strobo to an exclusive camera.

Figure 31:
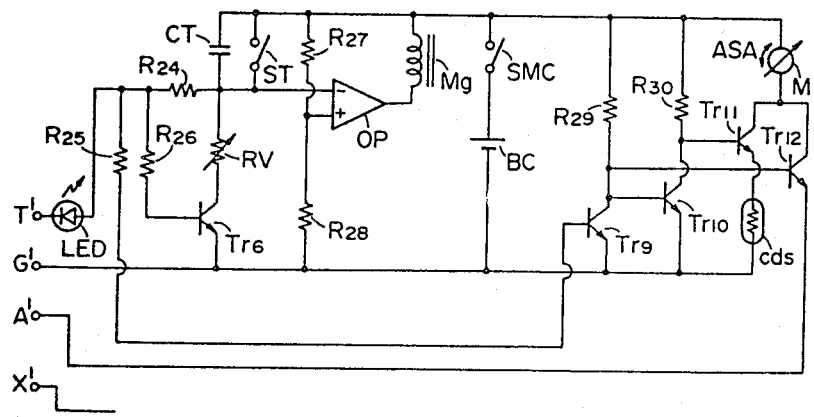
FIG. 31 is a diagram of the electric circuit in another embodiment of the exclusive camera with which the adapter of the invention is used.

FIG. 31 exemplarily shows the exposure control circuit of the exclusive camera which uses said adapter in the electric circuit. In FIG. 31, $R_{24}$ is a resistor for adjusting the flash photography shutter time, for example, 1/90 sec., and LED is a light-emitting diode connected between a terminal T' to be described and a resistor $R_{24}$ and disposed, for example, within a finder. The circuit of FIG. 31 further includes a variable resistor $R_v$ for a preferentially set shutter time, a time limit capacitor CT, a start switch ST adapted to be opened during the starting of the forward shutter curtain and to be closed upon completion of the closing movement of the rearward shutter curtain, an operational amplifier OP, a rearward curtain holding magnet Mg, and a main switch SMc. The electric circuit of the adapter is shown in FIG. 30. In FIG. 30, $\chi$, T, G and A are adapter terminals connected to various terminals provided on the shoe portion of the exclusive camera to be described. $\chi$ is a tuning contact signal terminal, T is a shutter time signal terminal, G is a grounded terminal and A is a designated aperture signal terminal. Designated by a' and b' are terminals connected to the terminals a and b of the strobo. The circuit of FIG. 30 further includes a capacitor $C_6$ for storing and holding a voltage signal produced by the resistor $R_2$ when the neon tube Ne is turned on, a diode $D_4$ and a resistor $R_{13}$ forming the charging circuit of the capacitor $C_6$, transistors $Tr_2$-$Tr_4$ for forming a display signal for confirming the light emission, transistors $Tr_5$, $Tr_6$ forming a monostable multivibrator circuit, resistors $R_{14}$-$R_{17}$, a time constant capacitor $C_7$, a power supply battery E and a main switch So. Designated by P.U.T. is a unijunction transistor for forming an oscillating circuit, and denoted by $R_{19}$ and $C_9$ are a time constant resistor and capacitor. Designated by $Tr_7$ is a transistor for short-circuiting the capacitor $C_9$. In FIG. 31, BC denotes a battery, CdS designates an object light receiving photoconductive element, and M designates an aperture meter whose needle is disposed in the camera's finder to display aperture valves to be set in the finder valve display. $R_{25}$ and $R_{26}$ are high resistance resistors, and $R_{27}$-$R_{30}$ are resistors. T', G', A' and X' designate terminals for contacting the aforementioned adapter terminals T, G, A and $\chi$, respectively. These terminals T', G', A' and X' are provided, for example, on the accessory shoe of the camera.

In the above-described construction, when the light adjusting strobo is mounted to the adapter and the assembly is mounted to the mounting shoe (not shown) of an exclusive camera, the terminals T, X, G and A of the adapter are contacted by the terminals T', X', G' and A' of the camera. $Tr_8$-$Tr_{12}$ are photography mode changeover transistors. The transistor $Tr_8$ becomes turned off if the signal level of the terminal T' is lowered when the main capacitor CM of the strobo has been charged up, to thereby render inoperative the variable resistor $R_v$ for a set shutter time and the integration circuit with the capacitor CT while, on the other hand, the transistors $Tr_9$-$Tr_{12}$ turn off the transistor $Tr_{11}$ and turn on the transistor $Tr_{12}$ by the variation in signal level of the terminal T'. Accordingly, unless a variation in level occurs to the terminal T', the exposure on the camera side is effected by reading the indication of the aperture value of the pointer of the meter M determined in accordance with the shutter time set by the resistor $R_v$ and the output of the CdS element, to thereby set the camera's aperture device, thus accomplishing natural light photography.

The meter M is such that the speed of the film used is displayed by a conventional mechanical addition mechanism and that the pointer of the meter M displays a proper aperture value corresponding to the brightness of the object by providing an aperture device in front of the CdS element and adjusting the opening in accordance with the shutter time value set by the resistor $R_\nu$. When the switch SMc of the camera, the switch SM of the strobo and the switch So of the adapter are closed, the shutter close controlling magnet Mg becomes electrically energized to hold the rearward curtain of the shutter. On the other hand, when the main switch SM of the strobo is closed, charging of the capacitors of the strobo is started. When the main capacitor CM has been charged up, the voltage induced in the resistor $R_2$ due to the turn-on current of the neon tube Ne charges the capacitor $C_6$ connected to the transistor $Tr_2$ of the adapter through terminals a-a' and, when the charge of this capacitor $C_6$ reaches a predetermined level, the transistor $Tr_2$ is turned on. At this time, the transistor $Tr_6$ of the monostable multivibrator circuit is turned off and therefore, the transistor $Tr_3$ is in ON state. When the transistor $Tr_2$ is turned on, there is formed a closed circuit of camera's battery $Bc-SMc-ST-R_{24}$-LED-terminal $T'-T-Tr_2-Tr_3-G-G'-Bc$ and the light-emitting diode LED is turned on, whereby it can be confirmed within the finder that the strobo has become ready to emit flashlight. At the same time, the transistor $Tr_8$ is turned off, so that the set shutter time resistor $R_\nu$ becomes inoperative. On the other hand, the transistor $Tr_9$ is turned off, the transistor $Tr_{11}$ is turned off and the transistor $Tr_{12}$ is turned on, so that the meter M and the photoconductive element CdS are disconnected from each other and the resistor $R_{23}$ of the adapter is connected to the meter M through terminals A-A'. Since the resistor $R_{23}$ has a resistance value corresponding to the designated aperture value, the pointer of the meter M displays the designated aperture value. Accordingly, when the main capacitor of the strobo has been charged up, the camera's shutter time is set to the flash photography shutter time by the resistor $R_{24}$, and the predetermined aperture value signal information designated by the strobo in accordance with the predetermined signal from the adapter is transmitted to the camera side by the resistor $R_{23}$ through terminals A-A' and displayed within the finder. The operator may read this displayed value and set the aperture device of the camera to such value, thereby completing the operation for flash photography.

When the shutter release button (not shown) is depressed and the forward shutter curtain starts to open, the switch ST is opened to start charging the capacitor CT through the resistor $R_{24}$ and the level of the inverting terminal of the operational amplifier OP is lowered. In the meantime, when the forward curtain of the shutter becomes fully open, the tuning contact, not shown, is closed, so that the trigger circuit of the strobo is operated through terminals X'-X and a'-a and the xenon tube emits light, as described above.

By the light emission of the xenon tube, a predetermined voltage is produced in the Zener diode ZD and the integrating operation of the integration circuit $PT_1$, $C_4$ is started. When the reflected light from the object reaches a predetermined quantity, $SCR_4$ is turned on and the thyristor $SCR_3$ is turned on by the voltage induced in the secondary winding of the transformer $T_2$, and $SCR_2$ is turned off by the action of the commutation capacitor $C_1$, thus stopping the light emission of the xenon tube. When the xenon tube Xe is triggered and the cathode voltage thereof sharply rises, the monostable multivibrator circuit is triggered by the differentiating circuit $R_{01}$, $CD_1$ through terminals a-a', resistor $R_{18}$ and $C_8$.

As the result, the transistor $Tr_6$ which has so far been turned off is turned on for a predetermined time, so that the transistor $Tr_7$ becomes turned off. As the result, the charging of the capacitor $C_9$ is started and the P.U.T. is turned on each time the capacitor $C_9$ is charged, and an intermittent signal of a predetermined period is continuously provided from the resistor $R_{22}$. The transistor $Tr_5$ is repeatedly turned on and off by such intermittent signal. In the meantime, the transistor $Tr_3$ remains in OFF state and therefore, the signal level of the terminal T is controlled by the transistor $Tr_5$ and the intermittent signal is transmitted to the camera side through terminals T and T', whereby the light-emitting diode is turned on and off. The tuning contact is closed to form a tuning signal when the forward shutter curtain becomes fully open and, immediately after such signal is formed, the voltage at the terminal of the time limit capacitor CT of the camera lowers to a predetermined value, so that the operational amplifier is inverted to deenergize the magnet Mg, whereby the holding of the rearward shutter curtain is released and the closing of the shutter takes place. When the rearward curtain starts to be closed immediately after the strobo emits light by the tuning signal, the light-emitting diode LED starts to be turned on and off as already described and thus, by the turn on and off of the diode LED, it is possible to confirm that the strobo has emitted light. The turn on and off of the diode LED continues for a predetermined time determined by the monostable multivibrator circuit, and thereafter the light-emitting diode stops being turned on and off.

Unless the neon tube Ne of the strobo is turned on or if the adapter is removed from the camera, the transistors $Tr_8$ and $Tr_{11}$ are turned on and therefore, natural light proper exposure photography is effected with the camera's shutter set to the shutter time set by the resistor $R_\nu$ and with the aperture set to the aperture value displayed by the CdS element.

While the foregoing embodiment has been described with respect to a case where the terminals a, b of the strobo and the terminals a', b' of the adapter and the terminals T, A, X, G of the adapter and the terminals T', A', X' of the camera are integrally mounted by means of the mounting foot and shoe, one or both of these coupling portions may be connected by a cable and this is better suited for a grip type strobo.

Further, in the foregoing embodiment, a strobo in which the charging detecting circuit provided by a neon tube is connected to the trigger terminal has been described as the versatile strobo, but if a strobo of the ordinary type in which the trigger terminal is simply provided in the serial circuit of a trigger capacitor and a trigger transformer is used as the strobo and a charging condition detecting circuit such as a neon tube and a resistor is provided between the terminals a' and b' of the adapter so that the charging condition of the trigger capacitor is detected by the detecting circuit of the adapter, the versatile strobo may be intactly utilized. In this case, the light emission signal of the xenon tube may be made multiplex at the trigger terminal as in the foregoing embodiment and the trigger terminal may of course be slightly reformed as a separate terminal.

While the foregoing embodiment has been described with respect to a camera of the shutter first type, it is of course applicable also to an exclusive camera of the aperture first type or the shutter and aperture first type and may be designed so that only the shutter time signal or only the aperture signal is formed within the adapter. Where only the aperture signal is formed, the resistor $R_{23}$ may be series-connected to the collector of the transistor $Tr_2$, for example, in the adapter circuit shown in FIG. 5 and in these cases, the resistor $R_{23}$ may be a tap resistor or a variable resistor so as to provide a plurality of designated aperture valves 2.8, 4, 5, 6 and so on.

Also, in the foregoing embodiment, various auto set signals are formed by the charging completion signal of the main capacitor, but it is also possible to receive only the main switch ON signal of the strobo and utilize such signal instead of the charging completion signal or it is of course possible to provide the adapter with a logic circuit or the like which will put out a preparation completion signal only when there are both of the main switch ON signal of the strobo and the charging completion signal, but even in this case, the terminal voltage of the trigger capacitor is provided from the trigger terminal as the charging signal from the strobo side and therefore, if a charging completion detecting circuit or the like is provided on the adapter side as required and a main switch closing signal terminal is added from the strobo side, then the adapter may be operatively associated with an ordinary versatile strobo simply by slightly reforming such strobo.

Figure 32:
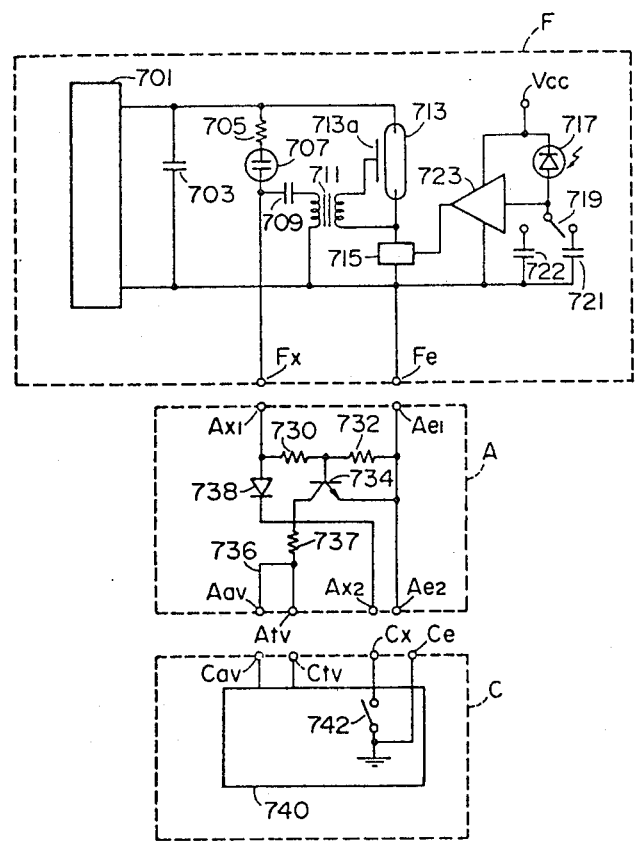
FIG. 32 shows the circuit connections in another modification of the flash illuminating system according to the present invention.

FIG. 32 shows the circuit connections between devices when the flash illuminating system to which the adapter device of the present invention is applied is separated into each device. In FIG. 32, the portion encircled by a dotted line F schematically designates the circuit of the light adjusting flash illuminating device. In this flash illuminating device, a main capacitor 703 for storing the light emission energy is connected to a conventional high voltage source, and the trigger capacitor 709 of a trigger circuit is connected to the main capacitor 703 through a resistor 705 and a neon tube 707 for detecting the charging voltage of the capacitor 703. The primary winding of the trigger transformer 711 of the trigger circuit is connected to the trigger capacitor 709, and the secondary winding thereof is connected to the trigger electrode 713a of a conventional discharge tube 713. A serial circuit comprising the discharge tube 713 and a conventional discharging current control circuit 715 is parallel-connected to the main capacitor 703. Designated by 717 is a photo-electric element for receiving the flashlight from the discharge tube 713 reflected by an object, not shown, and for converting such light into an electrical signal. One end of the photo-electric element 717 is connected to a constant voltage source Vcc and the other end thereof is connected to a film speed change-over switch 719. Designated by 721 is an integrating capacitor adapted to be connected to the change-over switch 719 when, for example, a film speed of ASA 100 is selected, and denoted by 722 is an integrating capacitor adapted to be connected to the change-over switch 719 when, for example, a film speed of ASA 400 is selected. Designated by 723 is a comparator circuit having an input end connected to the junction between the photoelectric element 717 and the change-over switch 719, the output end of the comparator circuit 723 being connected to the input end of the discharging current control circuit 715. The input end connected to a standard voltage source which is the other input end of the comparator circuit 723 is not shown in FIG. 32. The output end of the comparator circuit 723 is connected, in a conventional manner, to the gate of a conventional thyristor series-connected to the commutation capacitor, for example, in the conventional control circuit 715. Fe designates an earth electrode connected to the earth line of the device F and provided on the outer wall of the case. Fx designates a synchronizing signal electrode connected to the neon tube 207 and provided on the outer wall of the case, like the electrode Fe. The portion encircled by a dotted line A designates the circuit of the adapter device of the present invention, and $Ax_1$ designates a first synchronizing signal transmitting electrode removably connected to the synchronizing signal electrode Fx of the device F. The electrode $Ax_1$ is connected to a second synchronizing signal transmitting electrode $Ax_2$ of the camera through a diode 738 and also connected to a resistor 730 for forming a voltage dividing circuit. Denoted by 734 is an npn transistor having its base connected to the output end of the voltage dividing circuit, and the collector forming the output end thereof is connected through a resistor 737 to a photography mode change-over signal electrode Atv and a designated aperture signal electrode Aav, and the emitter thereof is connected to first and second earth electrodes $Ae_1$ and $Ae_2$.

The portion encircled by a dotted line C schematically designates the circuit of the camera, and the exposure control circuit 740 thereof is known, for example, from the aforementioned German patent publication and so, the detailed description thereof is omitted herein and only the electrodes will be described. Cav within the dotted line C designates a camera side designated aperture signal electrode removably connected to the designated aperture signal electrode Aav. The electrode Cav is connected to the aperture control circuit disclosed in the aforementioned German patent publication. Ctv designates a camera side photography mode change-over signal electrode removably connected to the photography mode change-over signal electrode Atv, and this electrode Ctv is also connected to the aperture control circuit and the shutter speed control circuit disclosed in the aforementioned German patent publication. Cx is a camera side synchronizing signal electrode removably connected to the synchronizing signal electrode $Ax_2$, and it is connected to the earth through a synchro contact 742 adapted to be closed when the shutter is fully open. Ce is a camera side earth electrode removably connected to a second earth electrode $Ae_2$.

Description will now be made of the operation of the flash illuminating system having the above-described construction. First, when the flash illuminating device F and the camera C are electrically connected through the adapter device A and an unshown main switch provided in the device F is closed, the main capacitor 703 is charged by the high voltage source 701. When the charging voltage of the main capacitor 703 rises to a level at which the discharge tube 713 can emit light, the neon tube 707 is turned on to start the charging of the trigger capacitor 709 while, at the same time, a current flows to the voltage dividing circuit through the neon tube 707 and the electrodes Fx and $Ax_1$ to turn on a transistor 734. When the transistor 734 is turned on, a current flows through the photography mode change-over signal electrodes Ctv and Atv and a resistor 737, so that the mode of the aperture control circuit and the shutter speed control circuit in the camera is changed over to the flash mode, as described in detail in the aforementioned German patent publication. Thus, the shutter speed is adjusted to 1/60 sec., for example, and in the aperture control circuit, the input end thereof is connected from the output end of the natural light metering circuit to the designated aperture signal electrode Cav. At this time, a voltage produced in the photography mode change-over signal electrode Atv, for example, a voltage corresponding to a designated aperture valve F=4, is applied to the input end of the aperture control circuit through a lead wire 736 and the designated aperture signal electrodes Aav and Cav.

Subsequently, when the camera's release button (not shown) is depressed, a mirror (not shown) moves upwardly and the aperture opening of a picture-taking lens (not shown) is determined to a size corresponding to the input voltage, for example, the aforementioned F=4, by the unshown aperture control circuit, whereafter the shutter (not shown) is opened. When the shutter is closed after it is opened by the unshown shutter speed control circuit for a time suitable for flash photography, the synchro contact 742 is closed in response to the closing of the shutter. Therefore, the charge stored in the trigger capacitor 709 is discharged through the electrodes Fx, $Ax_1$, diode 738, electrodes $Ax_2$, Cx, switch 742, earth electrodes Ce, $Ac_2$, $Ac_1$, Fe, and the primary winding of the transformer 711, and the discharge tube 713 is triggered by a trigger pulse produced in the secondary winding of the transformer 711 by this discharge. Also, by the triggering of the discharge tube 713, a discharging current control circuit 715 is triggered in a conventional manner and an unshown thyristor in the control circuit 715 series-connected to the discharge tube 713 is turned on, so that the charge stored in the main capacitor 703 is discharged through the discharge tube 713 and the control circuit 715 and the discharge tube 713 starts light emission to illuminate an unshown object. Thereafter, when a predetermined quantity of flashlight reflected from the object impinges on a photoelectric element 717, a light emission stopping signal is produced from the output end of the comparator circuit 723 and by this signal, the discharging current control circuit 715 interrupts the discharging path of the main capacitor 703. Thus, the light emission of the discharge tube 713 is stopped, thus completing the flash photography.

Figure 33:
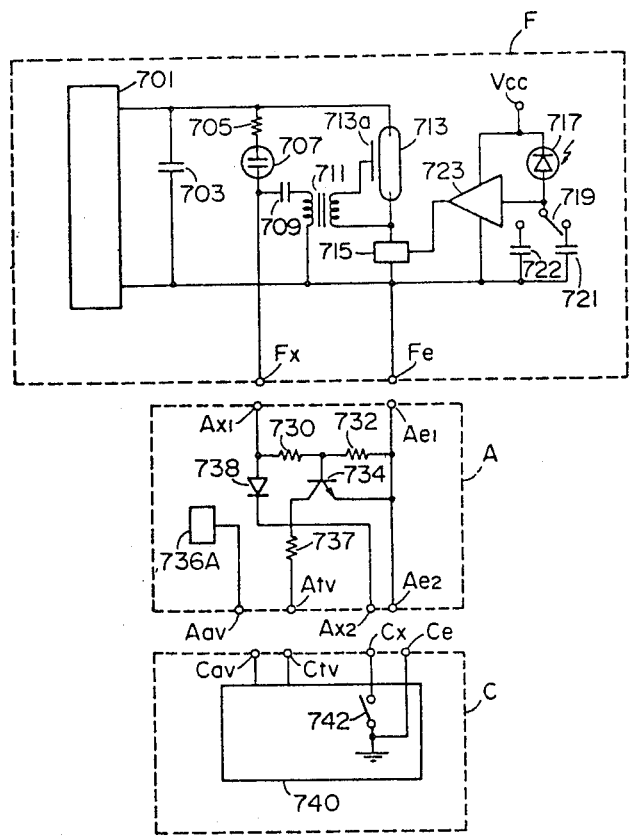
FIG. 33 shows the circuit connections in another embodiment of the present invention.

The foregoing embodiment is an example in which, for simplification of the circuit, the designated aperture signal electrode Aav of the adapter device A is connected to the photography mode change-over signal electrode Atv by a lead wire 736 and thereby the voltage produced in the electrode Atv is used as the voltage for the designated aperture signal, but in this embodiment the designated aperture signal cannot be selected arbitrarily. FIG. 33 shows an embodiment which solves such a problem.

The difference between the embodiment of FIG. 33 and the embodiment of FIG. 32 only resides in that instead of the photography mode change-over signal electrode Atv, the designated aperture signal electrode Aav in the adapter device A is connected to an aperture information setting circuit 736A, and such aperture information setting circuit 736A is disclosed in the aforementioned German Patent Publication No. 2,703,617 and FIG. 2 of Japanese Open Patent Application No. 33,621/1978 and so, detailed description of FIG. 33 is omitted herein.

In the foregoing embodiment, as described above, the transmission path for the synchronizing signal serves also as the transmission path for the photography mode change-over signal and the photography mode change-over circuit and the designated aperture information setting circuit are eliminated from the flash device, so that the flash device is smaller in size and lighter in weight and particularly, the mounting member of the flash device becomes simpler in construction. Also, the above-described simplified construction of the flash device leads to the inexpensiveness of the flash device.

According to the present invention, as has been described above, the flash illuminating device can be used arbitrarily with versatile cameras or exclusive cameras by using the adapter and therefore, the flash illuminating device itself may be of the versatile type or of the slightly reformed type which may be used with various cameras. Also, even where there are several types of exclusive cameras, if design is made such that the positions of the terminals of the adapter and the signal levels suitably match those of the cameras, the foregoing flash illuminating device can be utilized with any of the cameras and this leads to an advantage that a versatile flash illuminating device can be made to match exclusive cameras and automatic setting of various types of exposure information becomes possible. Thus, it is possible to provide a flash illuminating device which is excellent in operability and portability.

I claim:

1. An adapter device for use with a flash device and providing, through display means in a camera, a display for confirmation of light emission operation, comprising:
    (a) terminal means connectable with a flash circuit in the flash device for receiving a light emission signal generated upon flashlight emission operation of a flash tube;
    (b) signal forming circuit means connected to said terminal means and forming a confirmation signal in response to the light emission signal; and
    (c) terminal means for transmitting the confirmation signal to said display means in the camera.

2. An adapter device according to claim 1, wherein said signal forming means includes timer circuit means for generating an output for a period in response to the light emission signal, and output means for putting out the confirmation signal in response to the output from said timer circuit means.

3. A flash photography system for use with a camera having display circuit means, for performing flash photography, comprising:
    (A) a flash device having:
        (a) flash means;
        (b) accumulating means for accumulating flash energy;
        (c) completion signal forming circuit means for producing a completion signal when the flash energy accumulated by said accumulating means reaches a predetermined level; and
        (d) circuit means connected to said flash means to detect the operation state of said flash means and produce a flash signal in response to the operation of said flash means; and
    (B) an adapter device having:

(a) control circuit means for forming a first display signal in response to the completion signal and a second display signal in response to the flash signal, said control circuit means including timer circuit means for forming the second signal for a predetermined time period in response to the flash signal; and (b) terminal means for transmitting the first and second signals to said display circuit means in the camera.

* * * * *

UNITED STATES PATENT AND TRADEMARK OFFICE
CERTIFICATE OF CORRECTION

PATENT NO. : 4,315,679

DATED : February 16, 1982

INVENTOR(S) : ZENZO NAKAMURA

It is certified that error appears in the above-identified patent and that said Letters Patent is hereby corrected as shown below:

```
Column  1, line 38, "camer's" should read --camera's--.

Column  5, line 49, "and ND" should read --are ND--.

Column 14, line 36, "valve" should read --value--;
          line 40, "valves" should read --values--.

Column 15, line 27, "valve" should read --value--;
          line 38, "valve" should read --value--;
          line 44, "desposed" should read --disposed--.

Column 16, line 26, "valve" should read --value--;
          line 41, "valves" should read --values--;
          line 69, "valve" should read --value--.

Column 17, line 35, "valve" should read --value--;
          lines 48,49, delete "is" before "inserted".

Column 19, line 56, "valve" should read --value--.

Column 20, line 43, "valves to be set in the finder valve
                    display" should read --values to be set in
                    the finder value display--.
```

UNITED STATES PATENT AND TRADEMARK OFFICE
CERTIFICATE OF CORRECTION

PATENT NO. : 4,315,679

DATED : February 16, 1982

INVENTOR(S) : ZENZO NAKAMURA

It is certified that error appears in the above-identified patent and that said Letters Patent is hereby corrected as shown below:

Column 23, line 14, "valves" should read --values--.

Column 25, line 14, "valve" should read --value--.

Signed and Sealed this

Eleventh Day of January 1983

[SEAL]

Attest:

GERALD J. MOSSINGHOFF

*Attesting Officer*   *Commissioner of Patents and Trademarks*